United States Patent
Ryshtun et al.

(10) Patent No.: US 9,619,051 B2
(45) Date of Patent: Apr. 11, 2017

(54) ACTIVE STYLUS TO HOST DATA TRANSMITTING METHOD

(71) Applicant: Parade Technologies, Ltd., Santa Clara, CA (US)

(72) Inventors: Andriy Ryshtun, Lviv (UA); Jeff Boschee, Woodinville, WA (US); Viktor Kremin, Lviv (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 83 days.

(21) Appl. No.: 14/332,727

(22) Filed: Jul. 16, 2014

(65) Prior Publication Data

US 2015/0062094 A1    Mar. 5, 2015

Related U.S. Application Data

(63) Continuation of application No. 13/421,873, filed on Mar. 16, 2012, now Pat. No. 8,797,301.

(Continued)

(51) Int. Cl.
  *G06F 3/0354*   (2013.01)
  *G06F 3/041*    (2006.01)
  *G06F 3/044*    (2006.01)

(52) U.S. Cl.
  CPC ......... *G06F 3/03545* (2013.01); *G06F 3/044* (2013.01); *G06F 3/0416* (2013.01)

(58) Field of Classification Search
  CPC ................... G06F 3/03545; G06F 3/0354
  See application file for complete search history.

(56) References Cited

U.S. PATENT DOCUMENTS 4,273,958 A   6/1981  Hirata
5,149,919 A   9/1992  Greanias et al.
(Continued)

FOREIGN PATENT DOCUMENTS

CN    1679078 A      10/2005
CN    101714037 A    5/2010
(Continued)

OTHER PUBLICATIONS

U.S. Appl. No. 13/421,873: "Active Stylus to Host Data Transmitting Method" Andriy Ryshtun et al., filed Mar. 16, 2012; 84 pages.
(Continued)

*Primary Examiner* — Priyank Shah
(74) *Attorney, Agent, or Firm* — Morgan, Lewis & Bockius LLP

(57) ABSTRACT

Apparatus and methods of active stylus to host device data transmitting are described. One method receives, at a stylus, an indication that a host device is performing a first coordinate measurement operation to determine a coordinate of the stylus proximate to a capacitive sense array of the host device. The set of coordinate measurement operations includes a first measurement operation of a first set of electrodes of the capacitive sense array and a second measurement operation of a second set of electrodes of the capacitive sense array. While the host device is performing the set of coordinate measurement operations, the stylus transmits a data packet of stylus data to the host device. In particular, the stylus transmits a first bit of the data packet during the first measurement operation and transmits a second bit of the data packet during the second measurement operation.

20 Claims, 28 Drawing Sheets

Related U.S. Application Data

(60) Provisional application No. 61/599,302, filed on Feb. 15, 2012.

(56) References Cited

U.S. PATENT DOCUMENTS

| | | | |
|---|---|---|---|
| 5,247,138 A * | 9/1993 | Landmeier | G06F 3/03545 178/19.01 |
| 5,469,193 A * | 11/1995 | Giobbi | G06F 3/0325 345/157 |
| 5,729,251 A * | 3/1998 | Nakashima | G06F 3/03545 345/156 |
| 5,736,980 A * | 4/1998 | Iguchi | G06F 3/0412 178/20.03 |
| 6,002,387 A | 12/1999 | Ronkka et al. | |
| 6,009,317 A | 12/1999 | Wynn | |
| 6,081,261 A | 6/2000 | Wolff et al. | |
| 6,198,360 B1 | 3/2001 | Henrion | |
| 6,441,810 B1 | 8/2002 | Skoog et al. | |
| 6,641,533 B2 | 11/2003 | Causey, III et al. | |
| 6,690,156 B1 | 2/2004 | Weiner | |
| 6,822,639 B1 * | 11/2004 | Silverbrook | B41J 2/17503 345/173 |
| 7,245,293 B2 | 7/2007 | Hoshino et al. | |
| 7,292,229 B2 | 11/2007 | Morag et al. | |
| 7,406,393 B2 | 7/2008 | Ely et al. | |
| 7,986,716 B2 | 7/2011 | Veeramachaneni et al. | |
| 8,036,465 B2 | 10/2011 | Khomo | |
| 8,481,872 B2 | 7/2013 | Zachut | |
| 2004/0095333 A1 | 5/2004 | Morag et al. | |
| 2005/0162411 A1 | 7/2005 | Berkel van | |
| 2006/0012581 A1 | 1/2006 | Haim et al. | |
| 2007/0001950 A1 | 1/2007 | Zhang et al. | |
| 2007/0157193 A1 | 7/2007 | Lowe et al. | |
| 2007/0171211 A1 | 7/2007 | Perski et al. | |
| 2007/0177533 A1 | 8/2007 | Palay et al. | |
| 2008/0001078 A1 | 1/2008 | Pittel et al. | |
| 2008/0001925 A1 | 1/2008 | Xiaoping | |
| 2008/0055279 A1 | 3/2008 | Osada et al. | |
| 2008/0150917 A1 | 6/2008 | Libbey et al. | |
| 2008/0156546 A1 | 7/2008 | Hauck | |
| 2008/0158165 A1 | 7/2008 | Geaghan et al. | |
| 2009/0127003 A1 | 5/2009 | Geaghan | |
| 2009/0314552 A1 | 12/2009 | Underwood et al. | |
| 2010/0066693 A1 | 3/2010 | Sato et al. | |
| 2010/0085325 A1 | 4/2010 | King-Smith et al. | |
| 2010/0155153 A1 * | 6/2010 | Zachut | G06F 3/03545 178/18.03 |
| 2010/0170726 A1 | 7/2010 | Yeh et al. | |
| 2010/0181180 A1 | 7/2010 | Peter | |
| 2010/0206644 A1 | 8/2010 | Yeh | |
| 2010/0252335 A1 | 10/2010 | Orsley | |
| 2010/0274131 A1 | 10/2010 | Barnes et al. | |
| 2011/0122087 A1 | 5/2011 | Jang et al. | |
| 2011/0293171 A1 | 12/2011 | Vold et al. | |
| 2012/0050207 A1 | 3/2012 | Westhues et al. | |
| 2012/0062499 A1 | 3/2012 | Weaver et al. | |
| 2013/0207938 A1 | 8/2013 | Ryshtun et al. | |
| 2013/0207939 A1 | 8/2013 | Kremin et al. | |

FOREIGN PATENT DOCUMENTS

| | | |
|---|---|---|
| GB | 2393838 A | 4/2004 |
| JP | 8234902 A | 9/1996 |
| JP | 2002297300 A | 10/2002 |
| JP | 2003263274 A | 9/2003 |

OTHER PUBLICATIONS

Hofer and Kunz_Mighty Trace: Multiuser Tracking Technology_ Dated Apr. 5, 2008_4 pages.
International Search Report for International Application No. PCT/US12/52920 dated Dec. 7, 2012; 2 pages.
Tsang_Handwriting tracking based on coupled_dated _5 pages.
USPTO Non-Final Rejection for U.S. Appl. No. 13/421,873 dated Mar. 3, 2014; 13 pages.
USPTO Notice of Allowance for U.S. Appl. No. 13/421,873 dated May 29, 2014; 8 pages.
USPTO Notice of Allowance for U.S. Appl. No. 13/421,873 dated Jun. 16, 2014; 5 pages.
Wahab_Wireless pointing device using capacitive coupling_Dated Dec. 1997 _4 pages.
Written Opinion of the International Searching Authority for International Application No. PCT/US12/52920 dated Dec. 7, 2012; 5 pages.
Cypress Semiconductor Corporation, International Search Report and Written Opinion, PCTUS2011/045661, Feb. 17, 2012, 9 pgs.
Cypress Semiconductor Corporation, International Search Report, PCTUS2011/045675, Feb. 17, 2012, 6 pgs.
Cypress Semiconductor Corporation, International Search Report and Written Opinion, PCTUS2011/045687, Feb. 17, 2012, 7 pgs.
Cypress Semiconductor Corporation, International Search Report and Written Opinion, PCTUS2012/047308, Aug. 17, 2012, 5 pgs.
Cypress Semiconductor Corporation, 1st Office Action, CN201180002763.4, Jul. 24, 2015, 20 pgs.
Green, "Quadrature Receiver Mismatch Calibration," dated Nov. 1999, 4 pgs.
Hill et al., "Smart Sensor Instrumentation Development Example Including the New Paradigm of an FPGA Based System," Dated 2007, 13 pgs.
Cypress Semiconductor Corporation,Office Action, CN201180002771.9 dated Nov. 2, 2015, 18 pgs.
Kremin, Office Action, U.S. Appl. No. 13/213,895, Oct. 9, 2012, 15 pgs.
Kremin, Final Office Action, U.S. Appl. No. 13/213,895, Mar. 14, 2013, 17 pgs.
Kremin, Office Action, U.S. Appl. No. 13/213,895, Jul. 18, 2013, 21 pgs.
Kremin, Final Office Action, U.S. Appl. No. 13/213,895, Oct. 3, 2013, 23 pgs.
Kremin, Office Action, U.S. Appl. No. 13/213,895, Feb. 19, 2014, 21 pgs.
Kremin, Final Office Action, U.S. Appl. No. 13/213,895, Apr. 22, 2014, 24 pgs.
Kremin, Office Action, U.S. Appl. No. 13/213,895, Jul. 29, 2014, 22 pgs.
Kremin, Final Office Action, U.S. Appl. No. 13/213,895, Oct. 14, 2014, 24 pgs.
Kremin, Office Action, U.S. Appl. No. 13/213,895, Mar. 6, 2015, 24 pgs.
Kremin, Final Office Action, U.S. Appl. No. 13/213,895, May 14, 2015, 27 pgs.
Kremin, Office Action, U.S. Appl. No. 13/213,895, Dec. 10, 2015, 25 pgs.
Kremin, Final Office Action, U.S. Appl. No. 13/213,895, Mar. 23, 2016, 16 pgs.
Kremin, Office Action, U.S. Appl. No. 13/213,981, Oct. 20, 2012, 14 pgs.
Kremin, Final Office Action, U.S. Appl. No. 13/213,981, Mar. 14, 2013, 16 pgs.
Kremin, Office Action, U.S. Appl. No. 13/213,981, Sep. 12, 2013, 18 pgs.
Kremin, Final Office Action, U.S. Appl. No. 13/213,981, Nov. 25, 2013, 18 pgs.
Kremin, Office Action, U.S. Appl. No. 13/213,981, Feb. 27, 2014, 19 pgs.
Kremin, Final Office Action, U.S. Appl. No. 13/213,981, May 2, 2014, 20 pgs.
Kremin, Office Action, U.S. Appl. No. 13/213,981, Jul. 31, 2014, 20 pgs.
Kremin, Final Office Action, U.S. Appl. No. 13/213,981, Oct. 8, 2014, 22 pgs.
Kremin, Office Action, U.S. Appl. No. 13/214,048, Feb. 15, 2013, 14 pgs.

(56) References Cited

OTHER PUBLICATIONS

Kremin, Notice of Allowance, U.S. Appl. No. 13/214,048, May 29, 2013, 6 pgs.
Kremin, Office Action, U.S. Appl. No. 13/434,571, May 31, 2012, 18 pgs.
Kremin, Final Office Action, U.S. Appl. No. 13/434,571, Aug. 30, 2012, 17 pgs.
Kremin, Notice of Allowance, U.S. Appl. No. 13/434,571, Oct. 9, 2012, 5 pgs.
Wright, Office-Action, U.S. Appl. No. 13/214,048, Feb. 15, 2013, 14 pgs.
Wright, Notice-of-Allowance, U.S. Appl. No. 13/214,048, May 29, 2013, 6 pgs.
Wright, Office Action, U.S. Appl. No. 13/947,596, Jun. 10, 2014, 14 pgs.
Wright, Final Office Action, U.S. Appl. No. 13/947,596, Aug. 5, 2014, 16 pgs.
Wright, Office Action, U.S. Appl. No. 13/947,596, Mar. 4, 2015, 16 pgs.
Wright, Notice of Allowance, U.S. Appl. No. 13/947,596, May 4, 2015, 5 pgs.
Wright, Notice of Allowance, U.S. Appl. No. 13/947,596, Sep. 23, 2015, 5 pgs.
Wright, Notice of Allowance, U.S. Appl. No. 13/947,596, Apr. 6, 2016, 5 pgs.
Cypress Semiconductor Corporation, 2nd Office Action, CN201180002763.4, May 17, 2016, 19 pgs.
Cypress Semiconductor Corporation, Office Action, CN201180002768.7, Apr. 5, 2016, 9 pgs.
Cypress Semiconductor Corporation, Second Office Action 201180002771.9, Aug. 3, 2016, 9 pgs.
Kremin, Office Action, U.S. Appl. No. 13/213,895, Sep. 21, 2016, 17 pgs.
Parade, Notice of Allowance, CN201180002768.7, Oct. 10, 2016, 3 pgs.

* cited by examiner

ACTIVE STYLUS TO HOST DATA TRANSMITTING METHOD

CROSS-REFERENCE TO RELATED APPLICATIONS

This application is a continuation of U.S. patent application Ser. No. 13/421,873, filed Mar. 16, 2012, which claims priority to U.S. Provisional Application No. 61/599,302, filed Feb. 15, 2012, all of which are incorporated by reference herein in their entirety. This application is related to co-pending U.S. application Ser. No. 13/213,895, entitled "Capacitive Stylus with Palm Rejection," filed Aug. 19, 2011, the contents of which are hereby incorporated by reference. This application is related to co-pending U.S. application Ser. No. 13/213,981, entitled "Synchronizing a Stylus with a Capacitive Sense Array," filed Aug. 19, 2011, the contents of which are hereby incorporated by reference. This application is related to U.S. patent application Ser. No. 13/214,048, filed Aug. 19, 2011, now U.S. Pat. No. 8,493,359, entitled "Capacitive Stylus for a Touch Screen," issued Jul. 23, 2013, the contents of which are hereby incorporated by reference.

TECHNICAL FIELD

This disclosure relates to the field of user interface devices and, in particular, to capacitive sensor devices.

BACKGROUND

The use of a stylus with a touch screen interface is well established. Touch screen designs have incorporated many different technologies including resistive, capacitive, inductive, and radio frequency sensing arrays. Resistive touch screens, for example, are passive devices well suited for use with a passive stylus. The original PalmPilots® devices from the mid-1990s were one of the first successful commercial devices to utilize a resistive touch screen designed for use with a stylus and helped to popularize that technology. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered active stylus approaches have been implemented for use with touch screens and are found in many consumer applications such as point-of-sale terminals (e.g., the signature pad used for credit card transactions in retail stores) and other public uses. However, the need for a tethered cable is a significant drawback for private applications such as personal computers ("PCs"), smart phones, and tablet PCs.

BRIEF DESCRIPTION OF THE DRAWINGS

The present invention is illustrated by way of example, and not of limitation, in the figures of the accompanying drawings in which.

DETAILED DESCRIPTION

Apparatuses and methods of active stylus to host device data transmitting. One method receives, at a stylus, an indication that a host device is performing a first coordinate scan to determine coordinates of the stylus proximate to a capacitive sense array of the host device. While the host device is performing the first coordinate scan, the stylus transmits at least two bits of stylus data to the host device.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
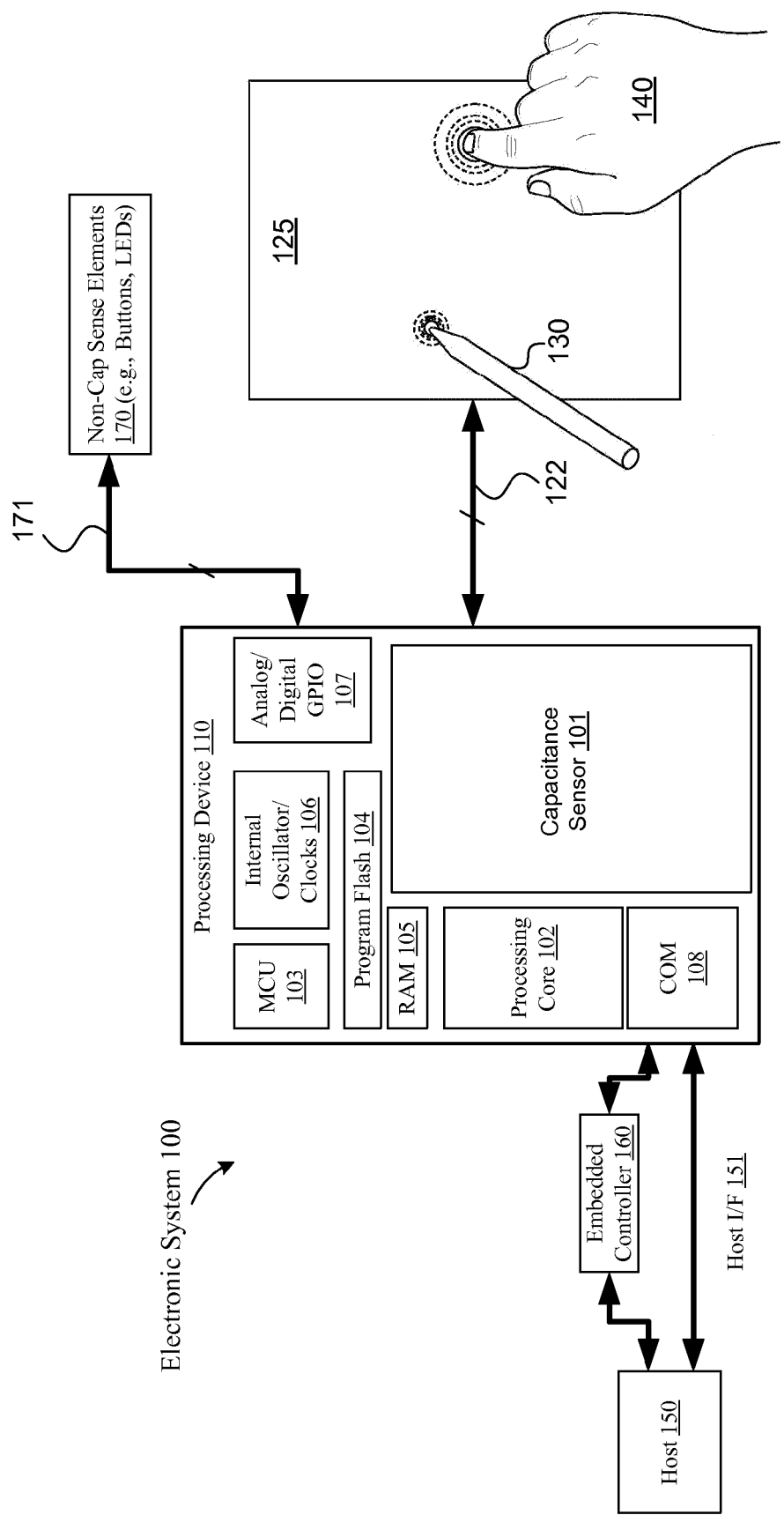
FIG. 1 is a block diagram illustrating one embodiment of an electronic system having a processing device for detecting a presence of a touch object and a stylus.

FIG. 1 is a block diagram illustrating one embodiment of an electronic system 100 having a processing device 110 for detecting a presence of a touch object 140 and a stylus 130. Electronic system 100 includes processing device 110, capacitive sense array 125, stylus 130, host processor 150, embedded controller 160, and non-capacitive sense elements 170. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. Alternatively, other configurations of capacitive sense arrays may be used. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configured to detect a presence of the active stylus 130 on the capacitive sense array 125, as well as a presence of the touch object 140. The processing device 110 may detect and track the active stylus 130 and the touch object 140 individually on the capacitive sense array 125. In one embodiment, the processing device 110 can detect and track both the active stylus 130 and touch object 140 concurrently on the capacitive sense array 125. In one embodiment, the active stylus 130 is configured to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configured to detect touch objects 140, is also used to detect and track the active stylus 130 without an additional PCB layer for inductively tracking the active stylus 130 as done conventionally.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO 107.

As illustrated, capacitance sensor 101 may be integrated into processing device 110. Capacitance sensor 101 may include analog I/O for coupling to an external component, such as touch-sensor pad (not shown), capacitive sense array 125, touch-sensor slider (not shown), touch-sensor buttons (not shown), and/or other devices. The capacitance sensor 101 may be configured to measure capacitance using mutual capacitance sensing techniques, self capacitance sensing technique, charge coupling techniques or the like. In one embodiment, capacitance sensor 101 operates using a charge accumulation circuit, a capacitance modulation circuit, or other capacitance sensing methods known by those skilled in the art. In an embodiment, the capacitance sensor 101 is of the Cypress TMA-3xx family of touch screen controllers. Alternatively, other capacitance sensors may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance sensor 101 in any chosen combination. In one embodiment, the TX and RX electrodes of the sense array 200 are configured to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. The capacitance sensor 101 does not use mutual capacitance or self-capacitance sensing to measure capacitances of the sense elements when performing a stylus can. Rather, the capacitance sensor 101 measures a charge that is capacitively coupled between the sense array 200 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in capacitance affecting some of the electrodes. In another embodiment, the presence of the finger increases the coupling capacitance between the two electrodes. Thus, the location of the finger on the capacitive sense array 125 can be determined by identifying both the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of centroid algorithms may be used to detect the center of the touch as would be appreciated by one of ordinary skill in the art having the benefit of this disclosure.

In one embodiment, the electronic system 100 includes a touch sensor pad coupled to the processing device 110 via a bus. Touch sensor pad may include a multi-dimension capacitive sense array. The multi-dimension sense array includes multiple sense elements, organized as rows and columns. In another embodiment, the touch sensor pad is an APA mutual capacitive sense array. In another embodiment, the touch sensor pad operates as a coupled-charge receiver.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 121, 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance sensor 101 may be integrated into the IC of the processing device 110, or alternatively, in a separate IC. Alternatively, descriptions of capacitance sensor 101 may be generated and compiled for incorporation into other integrated circuits. For example, behavioral level code describing the capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance sensor 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Figure 2:
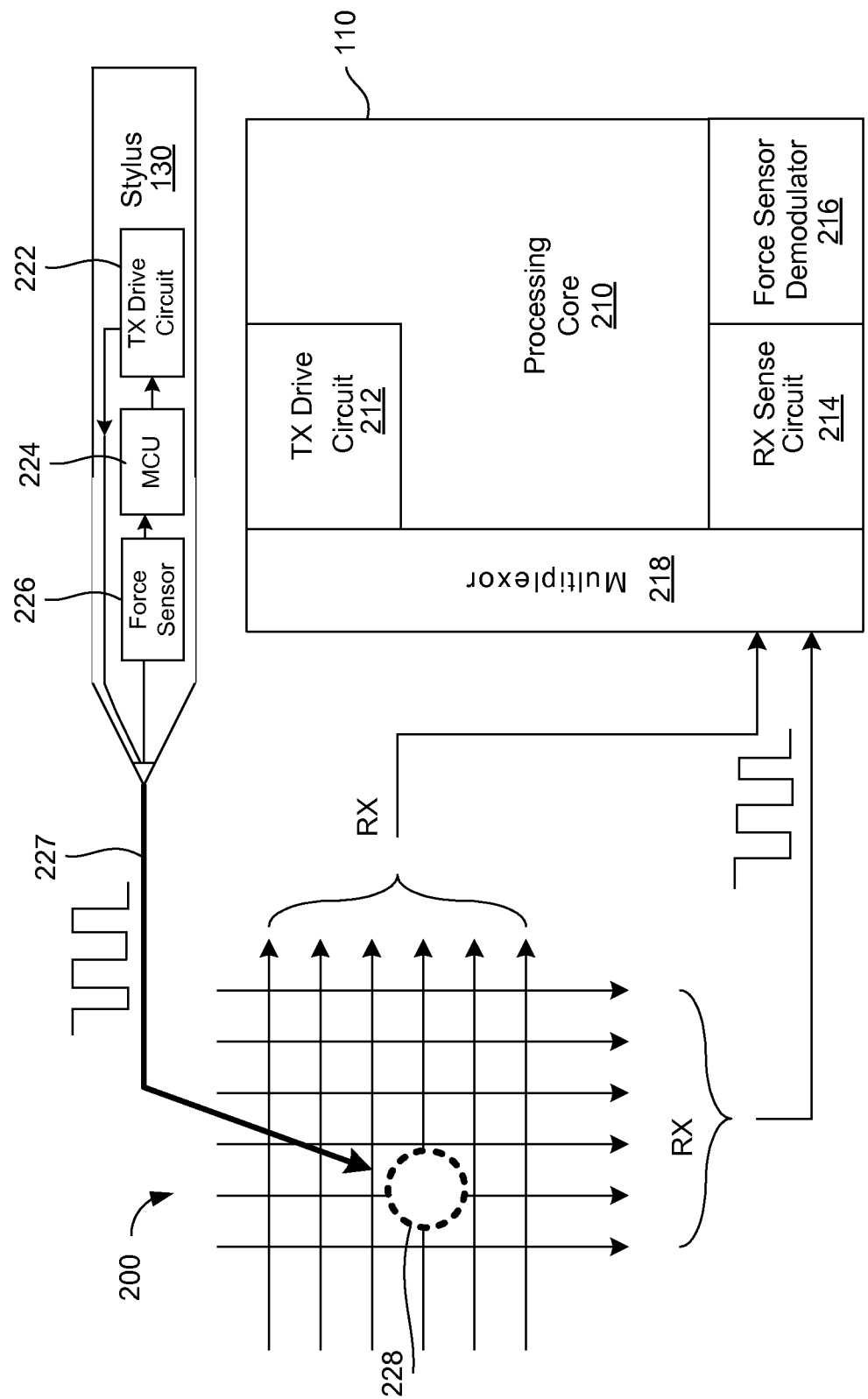
FIG. 2 is a block diagram illustrating one embodiment of a system including a capacitive sense array, a stylus, and a processing device that converts measured capacitances to touch coordinates.

FIG. 2 is a block diagram illustrating one embodiment of a system including a capacitive sense array, a stylus, and a processing device that converts measured capacitances to touch coordinates. The processing device 110 includes a processing core 210, a TX driver circuit 212, a RX sense circuit 214, a multiplexer 218, and a force sensor demodulator 216. In an embodiment, the processing core 210 is similar to the capacitance sensor 101 described above. The sense array 200 includes multiple lines that can be configured as TX lines or RX lines. For example, in one mode, the TX drive circuit 212 drives a TX signal on a first set of TX lines, and the RX sense circuit 214 measures signals on a second set of RX lines. In another mode, the TX lines are RX lines and the RX sense circuit 214 is configured to measure signals on two sets of RX lines (as illustrated in FIG. 2). These sets of RX lines can be considered as separate receive channels for stylus signal sensing. It should be noted that TX and RX lines are also referred to as TX and RX electrodes. The multiplexer 218 can be used to connect the TX lines or the RX lines to the TX drive circuit 212 or the RX sense circuit 214 based on whether the lines are being used as RX lines or TX lines.

In one embodiment, during normal finger scanning, a passive object (e.g., a finger or other conductive object) touches the sense array 200 at contact point (not illustrated in FIG. 2). The TX drive circuit 212 drives the TX lines with a TX signal. The RX sense circuit 214 measures the RX signals on RX lines. In an embodiment, the processing core 210 determines the location of contact point based on the mapping techniques as would be appreciated by one of ordinary skill in the art having the benefit of this disclosure. Alternatively, other techniques may be used to determine the contact point. The TX lines and RX lines are multiplexed by multiplexor 630. The processing core 210 provides the TX signal on the TX lines (rows) and measures the capacitance coupling on the RX lines (columns). In an embodiment, the TX and RX lines are orthogonal and may be used interchangeably (e.g., transmitting on columns and receiving on rows). In an embodiment, the TX drive circuit 212 transmits the TX signal through a high impedance ITO panel (TX lines), thus limiting the upper frequency limit and speed of the system. The total scan time may also dependent upon the number of TX lines and RX lines in the sense array 200. For example, the TX drive circuit 212 provides a TX signal on a TX line and simultaneously reads the capacitively coupled RX signal on a RX line, according to one embodiment. In another embodiment, the RX lines 640 are multiplexed in two or more scans.

In one embodiment, during stylus scanning, the stylus TX drive circuit 222 of stylus 130 provides a TX signal 227 directly to contact point 228 on sense array 200, thus eliminating the need to dedicate the second set of RX lines (previously TX in finger scanning) to transmitting a TX signal from the TX drive circuit 212. As such, the RX sense circuit 214 measures the RX signal on both the first set of RX lines (rows) and a second set of RX lines (columns) of sense array 200. This may result in faster position tracking because the TX signal no longer passes through the high impedance ITO lines, thus reducing the scan time to the total RX measurement. The active stylus 130 includes the TX drive circuit 222, a microcontroller (MCU) 224, and a force sensor 226. In one embodiment, the processing core 210 performs a normal scan of the sense array 200 during RX sensing of TX signal from the TX drive circuit 212 (described above), and a stylus scan of the sense array 200 during RX sensing of the stylus TX signal 227 (illustrated in FIG. 2). For the stylus scan, the processing core 210 measures a charge being capacitively coupled to the row and column electrodes of the sense array from the stylus. To further illustrate, a mutual capacitance scan uses both a TX and RX signal to track an object. As described above, this is typically done by scanning the RX lines for the driven TX line in a successive fashion by the processing core 210. In an array of N rows (TX signal) and M columns (RX signal), a complete scan would perform N×M total scans if one RX line is sensed at a time. For example, transmitting a TX signal ("TX'ing") on row 1, and receiving a receive signal ("RX'ing") on columns 1-M, followed by TX'ing on row 2 and RX'ing on columns 1-M, and so on in sequential fashion. Alternatively, more RX lines can be sensed at a time. In one embodiment, 4 or 8 RX lines are sensed at a time, but in other embodiments, all RX lines may be sense simultaneously or sequentially. With multiple RX channels to sense more than one RX line at the same time, the complete scan would be (N*M)/(# RX channels). In contrast, a stylus scan may not use a TX signal by the TX drive circuit 212 and a complete scan would perform a single RX signal measurement on each row and column, or N+M scans, thus resulting in a significantly reduced stylus scanning time for the entire sense array as compared with mutual capacitance scanning time for the entire sense array. Like above, multiple RX channels can be used to sense multiple RX lines at the same time. In this case, the complete scan would be (N+M)/(# RX channels).

In the depicted embodiment, the TX driver circuit 22 generates a stylus TX signal 227 from the tip of the active stylus 130 into the touch screen. The processing core 210 senses this signal and resolves this to be the point of the active stylus 130. Synchronization between the processing core 210 sensing and the signal generated by the active stylus 130 is used to obtain correct operation, as described below with respect to FIGS. 3 and 4. In the un-tethered active stylus, this synchronization is done wirelessly. The host side (e.g., tablet side) antenna transmits a synchronization signal that is received by an antenna inside the active stylus 130. In one embodiment, the un-tethered active stylus solution uses magnetic coupling between the host and the stylus for signal transmitting. In this embodiment, the antenna design provides a uniform magnetic field across the display surface.

As described above, a passive stylus may be used as a touch object to interface with the various touch screens described above. In contrast to passive styluses, an active stylus 130 provides the transmit signal 227 (TX signal). This signal 227 may be provided to the active stylus 130 by the processing core 210 as part of the synchronization. The active stylus 130 capacitively couples the stylus TX signal 227 to the sense array 200. In an embodiment, the stylus signal amplitude, frequency, phase, etc., may be the same or similar to that which is utilized for finger sensing by the processing core 210. Alternatively, the stylus TX signal may be different from the TX signal from the TX drive circuit 212, in amplitude, frequency, and phase. In another embodiment, the stylus TX signal may have a different code for code modulation than a code used in the TX signal from the TX drive circuit 212. In an exemplary embodiment, the stylus TX signal 227 has greater amplitude than the finger sensing TX signal from the TX drive circuit 212. For example, in one exemplary embodiment, the stylus TX signal 227 ranges from approximately 20-50V, as compared with the approximately 5-10V typically provided by the processing core 210. Alternatively, other voltages may be used as would be appreciated by one of ordinary skill in the art. The higher stylus TX voltage couples more charge to the sense array 200 more quickly, thus reducing the amount of time used to sense each row and column of the sense array 200. Other embodiments may incorporate higher voltages on the sense array TX lines to obtain similar time efficiency improvements for finger sensing.

In an embodiment, the active stylus 130 applies a higher frequency on the stylus TX signal 227 than the TX signal frequency from TX drive circuit 212 to achieve a reduced sensing time. Charge may be capacitively coupled from the active stylus 130 to the sense array 200 during the rising and falling edges of the stylus TX signal 227. Thus, a higher TX frequency provides a greater number of rising and falling edges over a given period of time, resulting in greater charge coupling. The practical upper limit of the TX frequency in finger sensing mode (e.g., TX signal on sense array 200 for finger sensing) is dependent upon the resistor-capacitor ("RC") time constant of the panel's individual sense elements and interconnect (not shown). This is typically due to high impedance materials (e.g. ITO) used in the fabrication of the sense array 200. A high-impedance sense array (e.g., sense array 200) may result in a high time constant and resulting signal attenuation of the rows (TX lines) and columns (RX lines) of sense elements, which may limit the maximum sensing frequency. When using an active stylus to transmit the stylus TX signal 227 directly to a contact point 228 on sense array 200, the stylus TX signal 227 does not pass through the high impedance path, and therefore the maximum operating frequency for the stylus TX signal 227 can be increased. For example, the time constant of the RX traces (both rows and columns) may be used to determine an upper frequency limit, but this will typically be is at least double the upper frequency limit used in finger sensing. Typically, the impedance is half to the impedance when performing mutual capacitance scanning, since the row's impedance is eliminated and the column's impedance remains (or vice versa). It should be noted that both finger sensing and stylus sensing use frequency selection where the operation period should be smaller than the panel's time constant. So, restrictions for the operation frequency selection may be approximately the same for finger and stylus sensing.

Although the RX lines (electrodes) appear as lines in FIG. 2, these lines may represent bars or elongated rectangles or other tessellated shapes such as diamonds, rhomboids, and chevrons. Alternatively, other useable shapes may be used as would be appreciated by one of ordinary skill in the art having the benefit of this disclosure.

Figure 3:
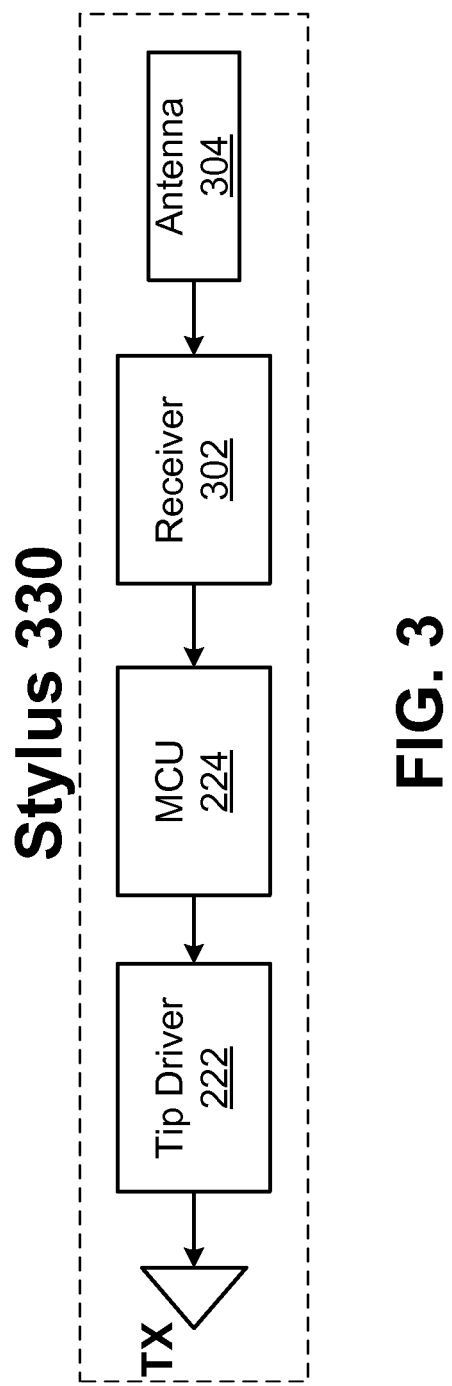
FIG. 3 is a block diagram illustrating one embodiment of a stylus configured to synchronize to a host device.

FIG. 3 is a block diagram illustrating one embodiment of a stylus 330 configured to synchronize to a host. The stylus 330 includes the TX drive circuit 322 (also referred to as a tip driver), the controller 224, a receiver 302, and an antenna 304. The host (illustrated and described below with respect to FIG. 4) generates a TX signal and transmits the TX signal to the stylus 330. The signal can be transmitted by radio, inductively, optically, or other methods of communication. The receiver 302 receives the TX signal via the antenna 304 and the receiver 302 can send the TX signal to the CONTROLLER 224 to be transmitted by the stylus tip via the TX drive circuit 222. In one embodiment, the receiver 302 receives the TX signal through the antenna 304 at 13.56 MHz. Alternatively, other frequency and other communication mediums may be used as would be appreciated by one of ordinary skill in the art having the benefit of this disclosure.

In an embodiment, the stylus 330 is powered by battery voltage. The battery voltage may be provided by battery cells (e.g., 1.5V AAA cells). A booster (not illustrated) may boost the battery voltage delivered to a tip driver 323 (e.g., a TX driver circuit 222), allowing the tip driver 322 to amplify the TX signal to a higher voltage (e.g., 10V-20V). A high voltage stylus TX signal may enable the host 400 to detect the stylus 330 when it is "hovering," or in close proximity to the ITO panel 420, but not physically touching an overlay disposed over the ITO panel 420. A high voltage stylus TX signal may also provide for faster and more robust detection by the host 400.

Figure 4:
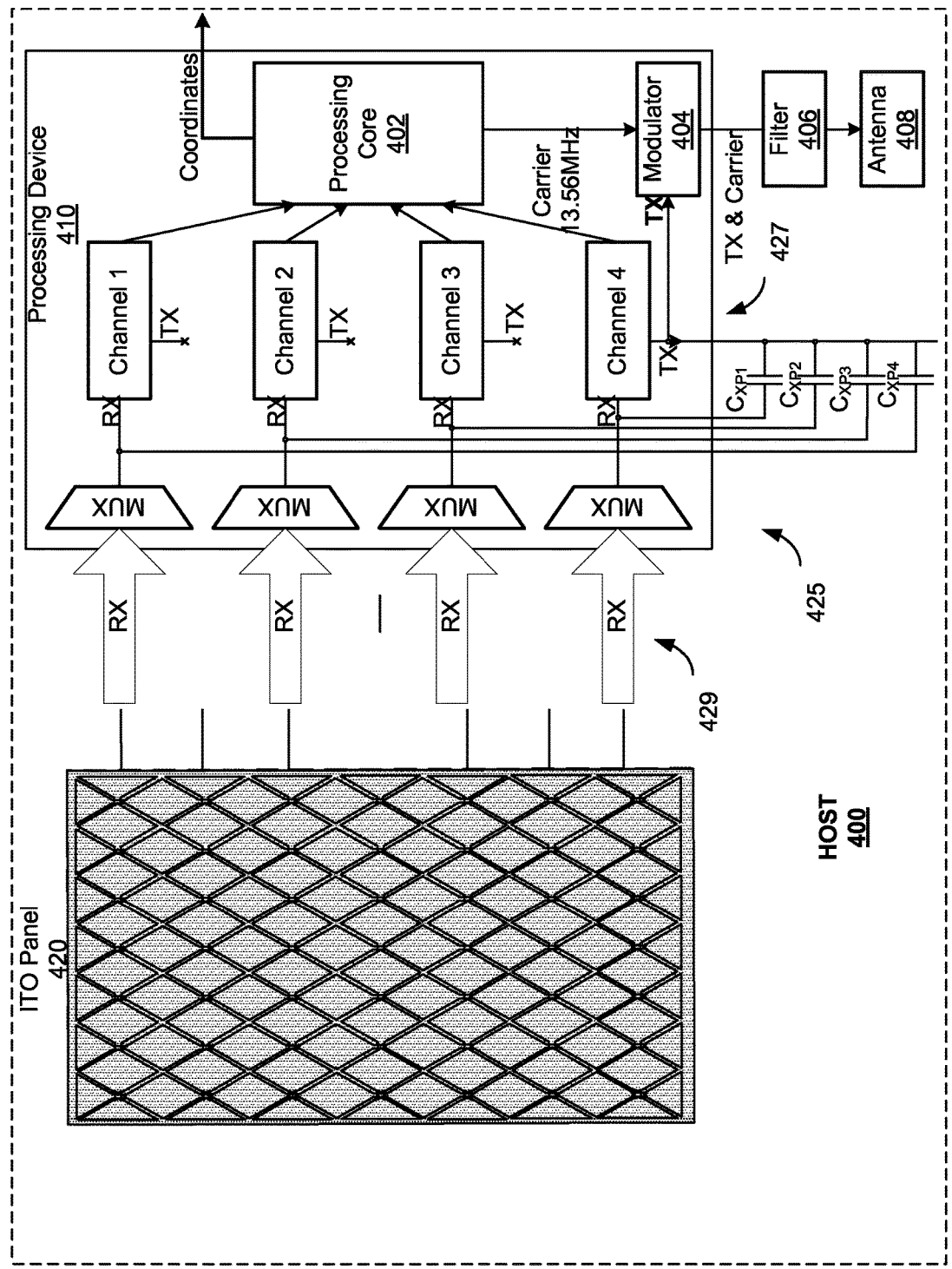
FIG. 4 is a block diagram illustrating one embodiment of a host device configured to synchronize to a stylus.

FIG. 4 is a block diagram illustrating one embodiment of a host 400 configured to synchronize to a stylus. The host 400 includes an ITO panel 420, processing device 410, a filter 406, and an antenna 408. The processing device 410 includes multiplexor devices ("MUXs") 425, multiple RX channels 427, a processing core 402, and a modulator 404. The ITO panel 420 is composed of rows and columns of electrodes. In an embodiment, the rows and column are the TX lines and RX lines 429. The rows and columns are coupled to the MUXs 425, respectively. MUXs 425 are coupled to the RX channels 427, which are coupled to the processing core 402. The processing core 402 is coupled to the modulator 404. In an embodiment, the processing core 402 performs similar functions as described above with respect to processing device 110 or capacitance sensor 101. In another embodiment, the processing core performs the operations described above with respect to the processing core 210 of FIG. 2.

In an embodiment, the processing device 410 generates and couples a TX signal to a transmitter. The transmitter wirelessly couples the TX signal to a receiver of the stylus (antenna 304 of stylus 330). In one embodiment, the transmitter inductively couples the TX signal to the receiver 302. In other embodiments, the transmitter may wirelessly couple the TX signal in a variety of ways including radio frequency, optical, ultrasound, and other mediums that would be appreciated by one of ordinary in the art. The receiver 302 receives TX signal from the transmitter and couples demodulated TX signal to the stylus for driving the TX signal at the stylus tip as described above.

In the depicted embodiment, the processing device 410 generates and couples a TX signal to the modulator 404, which receives a carrier signal (e.g., 13.56 MHz, which is the radio-frequency identification (RFID) standard) from the processing core 402, whereas the TX signal may have a lower frequency than the carrier signal (e.g., approximately 100 kHz to 500 kHz). The modulator 404 modulates the TX signal with the carrier signal, and sends the modulated signal to the filter 406, which filters out any unwanted frequencies on the modulated TX signal. For example, a high pass or band pass filter may be used to remove unnecessary noise or harmonics in the modulated TX signal. The filter 406 sends the signal via the antenna 408 to the receiver 302 of the stylus 330. The modulator 404 may modulate the TX signal using amplitude shift-keying (ASK), frequency shift keying (FSK), phase-shift keying (PSK), binary phase shift keying (BPSK), or other modulation schemes as would be appreciated by one of ordinary skill in the art having the benefit of this disclosure.

In one embodiment, the antenna 408 is an antenna coil that wirelessly broadcasts the filtered and modulated TX signal 925. In an embodiment, the antenna coil may broadcast the modulated TX signal in a variety of formats including, but not limited to, radio frequency ("RF"), inductance, optics, electrostatic coupling, and ultrasound. In one embodiment, the transmitter modulates the TX signal with an RF carrier wave (e.g., 433 MHz, 900 MHz, or 2.4 GHz). In another embodiment, the transmitter utilizes an inductive link to inductively couple the lower frequency RFID modulated carrier wave (modulated TX signal) to the inductive receiver. Inductively coupling an RFID carrier frequency generally consumes less power than an RF carrier wave and may provide longer battery life in the stylus. In some embodiments, using an RFID carrier frequency may provide significant advantages. For example, there are no broadcast licensing requirements associated with broadcasting RFID frequencies worldwide. Furthermore, at RFID frequencies, the metal stylus case and stylus tip may function as additional electric field antennas, providing for a more robust receiver block. In one embodiment, the RFID carrier frequency is frequency divided to generate the TX signal, thus providing good noise suppression at the receiver block.

In one embodiment, the TX signal sent by the antenna 408 is the same signal as the TX signal generated and applied to the ITO panel 420 on the TX lines during finger position tracking. Alternatively, the TX signal may be a different signal than the TX signal generated and applied to the ITO panel 420 and may have different signal characteristics (e.g., different frequency, phase, or code modulation). In another embodiment, the processing device 410 sends a synchronization signal, or timing data, whereby the stylus 330 generates the stylus TX signal based on the synchronization signal received by the receiver 302 from the host 440. In an embodiment, the synchronization signal has different signal characteristics than the TX signal generated and applied to the ITO panel 420 during finger position tracking.

The stylus 330 capacitively couples the amplified stylus TX signal from the stylus tip to the ITO panel 420. The rows and columns of electrodes (configured as RX lines 429 in stylus position tracking mode) sense the stylus TX signals and send the received stylus TX signals to the processing core 402 via MUXs 425 and the RX channels 427. In an embodiment, the stylus TX signals are referred to as RX signals once they are sensed by the rows and/or columns of electrodes on the ITO panel 420. In an embodiment, the processing device 410 performs a stylus scan of the rows and columns of ITO panel 420 when sensing the stylus TX signal. The processing device 410 determines the location of the stylus 330 based on the relative strength of the TX signal on the rows and columns elements of the ITO panel 420

The synchronized operation of the host 400 and stylus 330 enables the processing device 410 to substantially simultaneously track a passive touch object (e.g., finger) and stylus 330 on the ITO panel 420. Synchronization ensures that the stylus 330 transmits a stylus TX signal during a period when the processing device 410 is not TX'ing for passive touch object sensing.

In an alternative embodiment, the stylus 330 is configured to operate as the timing "master," and has a transmitter similar to transmitter of the host to send synchronization information to the host, which would include a receiver similar to receiver 302. In another embodiment, the stylus, the host, or both may include transceivers that allow for bi-directional communication. It should be noted that the communication between the host and the stylus for synchronization is done on a communication channel or communication link. The communication channel or link may be considered a backchannel that is used to communication data between the host and stylus. The communication data may include synchronization information as described herein, as well as additional data, such as force data, button data, or the like. The communication channel or link may be a RF link, Bluetooth link, an optical link, an infrared (IR) link, or other communication channels/links as would be appreciated by one of ordinary skill in the art having the benefit of this disclosure. When the stylus 330 operates as the timing "master," the stylus 330 sends the carrier modulated TX signal to the host. A carrier generator, frequency divider, and modulator on stylus 330 provide a modulated TX signal to the host, where the host is synchronized to operate at the same phase and frequency as the stylus TX signal. The modifications to the system needed to synchronize the host to a master stylus TX signal would be appreciated by one having ordinary skill in the art with the benefit of this disclosure.

Figure 5:
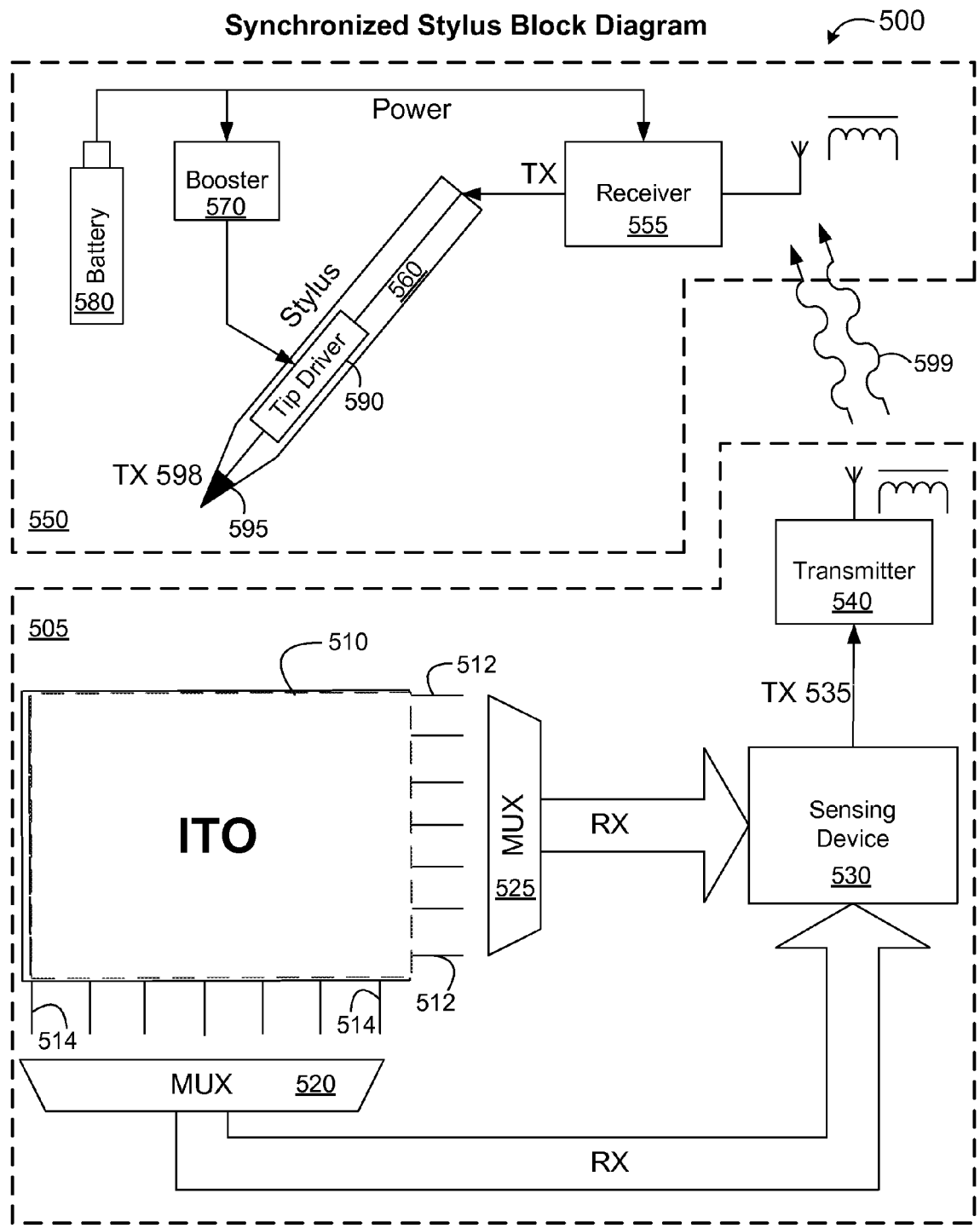
FIG. 5 is a block diagram illustrating one embodiment of an electronic system for synchronizing a stylus to a host device.

FIG. 5 is a block diagram illustrating one embodiment of an electronic system 500 for synchronizing a stylus 550 to a host device 505. The host device 505 includes a capacitive sense array 510, multiplexor ("MUX") devices 520 and 525, sensing device 530, and transmitter 540. In an embodiment, the capacitive sense array 510 is an all-points addressable mutual capacitive sense array (e.g., sense array 200). In yet another embodiment, the capacitive sense array 510 is an ITO panel. The capacitive sense array 510 ("sense array 510" or "ITO 510") is composed of rows 512 and columns 514 of electrodes as described in conjunction with FIG. 2. In an embodiment, the rows 512 and column 514 are the TX lines (alternatively RX lines) and RX lines of FIG. 2. The rows 512 and columns 514 are coupled to the MUX's 525 and 520, respectively. MUX's 520, 525 are coupled to the sensing device 530. The sensing device 530 is coupled to the transmitter 540. In an embodiment, the sensing device 530 performs a similar function as the capacitive sense circuit 101 of FIG. 1. In another embodiment, the sensing device 530 is the processing device 110 of FIG. 2.

In the depicted embodiment, the stylus block 550 comprises a receiver 555, a battery 580, a booster 570, a tip driver 590, and a stylus tip 595. The stylus block 550 represents the components that are housed within the stylus body 560 as described in FIG. 3. The battery 580 is coupled to the booster 570 and receiver 555. The booster 570 is coupled to the tip driver 590.

In an embodiment, the sensing device 530 generates and couples a TX signal 535 to the transmitter 540. The transmitter 540 wirelessly couples the TX signal 535 to the receiver 555. In one embodiment, the transmitter 540 inductively couples the TX signal 535 to the receiver 555. In other embodiments, the transmitter may wirelessly couple the TX signal 535 in a variety of ways including radio frequency, optical, ultrasound, and other mediums that would be appreciated by one of ordinary in the art. The receiver 555 receives TX signal 599 from the transmitter 540 and couples demodulated TX signal to the stylus 550.

In one embodiment, the TX 535 signal sent by the transmitter 540 is the same signal as the TX signal generated and applied to the ITO 510 on the TX lines 512 (or 514) during finger position tracking. Alternatively, the TX signal 535 may be a different signal than the TX signal generated and applied to the ITO 510 and may have different signal characteristics (e.g., different frequency, phase, or code modulation). In another embodiment, the transmitter 540 sends a synchronization signal 599, or timing data, whereby the stylus 550 generates the stylus TX signal 598 based on the synchronization signal 599 received by the receiver 555 from the transmitter 540. In an embodiment, the synchronization signal 599 has different signal characteristics than the TX signal generated and applied to the ITO 510 during finger position tracking.

In an embodiment, the battery 580 voltage may be provided by battery cells (e.g., 1.5V AAA cells). The booster 570 boosts the battery voltage delivered to the tip driver 590, allowing the tip driver 590 to amplify the TX signal 535 to a higher voltage (e.g., 10V-20V). A high voltage stylus TX signal 598 may enable the host device 505 to detect the stylus 550 when it is "hovering," or in close proximity to the capacitive sense array 510, but not physically touching an overlay disposed over the capacitive sense array 510. A high voltage stylus TX signal 598 may also provide for faster and more robust detection by the sensing device 530.

The stylus 550 capacitively couples the amplified stylus TX signal 598 from the stylus tip 595 to the capacitive sense array 510. The rows 512 and columns 514 of electrodes (configured as RX electrodes in stylus position tracking mode) sense the stylus TX signals 598 and send the received stylus TX signals 598 to the sensing device 530 via MUX's 520 and 525. In an embodiment, the stylus TX signals 598 are referred to as RX signals once they are sensed by the rows 512 and/or columns of electrodes on the ITO 510. As shown, the sensing device 530 receives the stylus TX signal 598 by RX'ing on both the rows 512 and columns 514 of electrodes of capacitive sense array 510, as described above in conjunction with FIG. 2 (i.e., RX lines). In an embodiment, the sensing device 530 performs a stylus scan of the rows 512 and columns 514 of capacitive sense array 510 when sensing the stylus TX signal 598. The sensing device 530 determines the location of the stylus 550 based on the relative strength of the TX signal 598 on each of the rows 512 and columns 514 elements of the capacitive sense array 510.

The synchronized operation of the host device 505 and stylus 550 enables the sensing device 530 to substantially simultaneously track a passive touch object (e.g., finger) and stylus 550 on the sense array 510. Synchronization ensures that the stylus 550 transmits a stylus TX signal 598 during a period when the sensing device 530 is not TX'ing for passive touch object sensing.

In one embodiment, the receiver 555 is configured to receive indications of coordinate scans performed by a host device to determine coordinates of the stylus proximate to ITO panel 510 of the host device 505. The processing device of the stylus (not illustrated in FIG. 5) is coupled to the receiver and the tip driver 590. The processing device is configured to transmit at least two bits of stylus data per each of the coordinate scans performed by the host device. In another embodiment, the stylus includes a force sensor coupled to the processing device. The processing device implements a stylus data state machine. The state machine includes a first state in which the force sensor is not pressed, a second state in which the force sensor is pressed, a third state in which the force sensor is still pressed, and a fourth state in which the force sensor is released. The processing device can receive indications via the receiver 555 that the host is performing coordinate scans and can transmit at least two bits of stylus data per each of the coordinate scans via the tip driver 590 in the respective one of the first state, second state, third state, and fourth state.

In another embodiment, the host device includes a second processing device coupled to the transmitter 540 and the ITO panel 510. The second processing device is configured to perform the coordinate scans to determine the coordinates of the stylus proximate to the ITO panel 510. The host device 505 is configured to transmit the indications to the receiver 555 of the stylus 550 via the transmitter 540. In one embodiment, the second processing device performs a coordinate scan by performing a row scan and a column scan. The processing device of the stylus transmits a first bit of the at least two bits during the row scan and transmits a second bit of the at least two bits during the column scan. The stylus data may include at least one of the following: force sensor state, a button state, a start packet indicator, or an end packet indicator. The stylus data may be transmitted as part of a stylus data packet as described in more detail below.

Although not illustrated in FIG. 5, the stylus 560 may include a force sensor and a button, each coupled to the processing device. The processing device is configured to obtain force sensor values form the force sensor and to obtain button statuses from the button (which may be one or more buttons). The processing device may calculate a checksums of a respective one of the force sensor values and a respective one of the button statuses. The processing device also creates force sensor packets with the respective ones of the checksums. The force sensor packets may include other bits as well as would be appreciated by one of ordinary skill in the art having the benefit of this disclosure.

Figure 6:
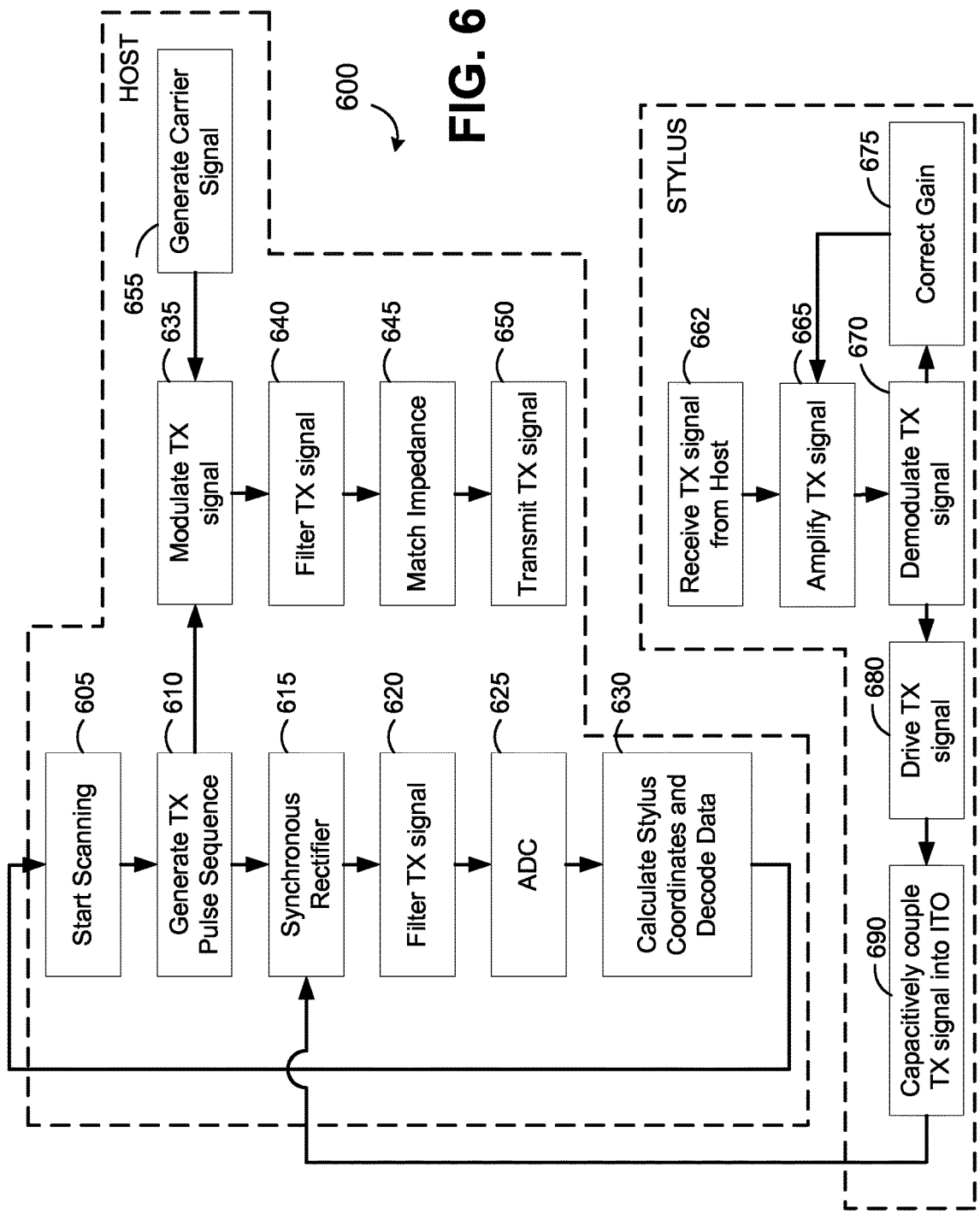
FIG. 6 is a flow chart of one embodiment of a method of synchronizing a stylus to a host device.

FIG. 6 is a flow chart of one embodiment of a method of synchronizing a stylus to a host device. The method 600 begins with the host device starting the scanning process (block 605). The sensing device generates a TX pulse sequence (block 610). In an embodiment, the TX pulse sequence is a pulse train of TX signals. At block 655, the carrier generator generates a carrier signal (e.g., 13.56 MHz RFID carrier frequency). The modulator modulates the carrier signal (block 635) with the TX pulse sequence generated at block 610. Although some aspects are described with respect to AM modulation, in other embodiments, the host device may implement other modulation schemes. A band pass filter filters the modulated TX signal (block 640). It should be noted that other types of filters may be used including low pass, high pass, notch filters, and others as would be appreciated by those of ordinary skill in the art. At block 645, a matching network matches the impedance of the filter and antenna, and the transmit block wirelessly transmits the modulated TX signal to the stylus (block 650).

The receiver block of the stylus wirelessly receives the modulated TX signal from the host device (block 662). The amplifier block amplifies the modulated TX signal (block 665), and the AM demodulator removes the carrier frequency from the TX signal (block 670). The gain correction block dynamically adjusts the gain of the amplifier to maintain a predetermined TX signal magnitude at the input of the demodulator (block 675). At block 680, the TX driver drives (amplifies) the TX signal. In one embodiment, the TX driver amplifies the TX signal to approximately 20-50V to improve the capacitive coupling between the stylus and sense array and enable hover detection capabilities by the host device (block 680). The stylus tip capacitively couples the amplified TX signal (stylus TX signal) to the ITO panel (block 690).

At block 615, the synchronous rectifier receives the stylus TX signal. A filtering block may be configured to operate as a low-pass filter (LPF) and integrate the rectified stylus TX signal to remove unwanted noise, harmonics, etc., (block 620). An analog-to-digital ("ADC") converter converts the analog stylus TX signal to a digital representation for further digital processing on the host device CPU or other processing device (block 625). At block 630, the host device CPU calculates the stylus coordinates, processes any additional data, and the scanning process repeats (block 605). In an embodiment, the additional data may include force data, button data, or other additional functionality encoded by stylus onto the stylus TX signal, as further described below.

Figure 7:
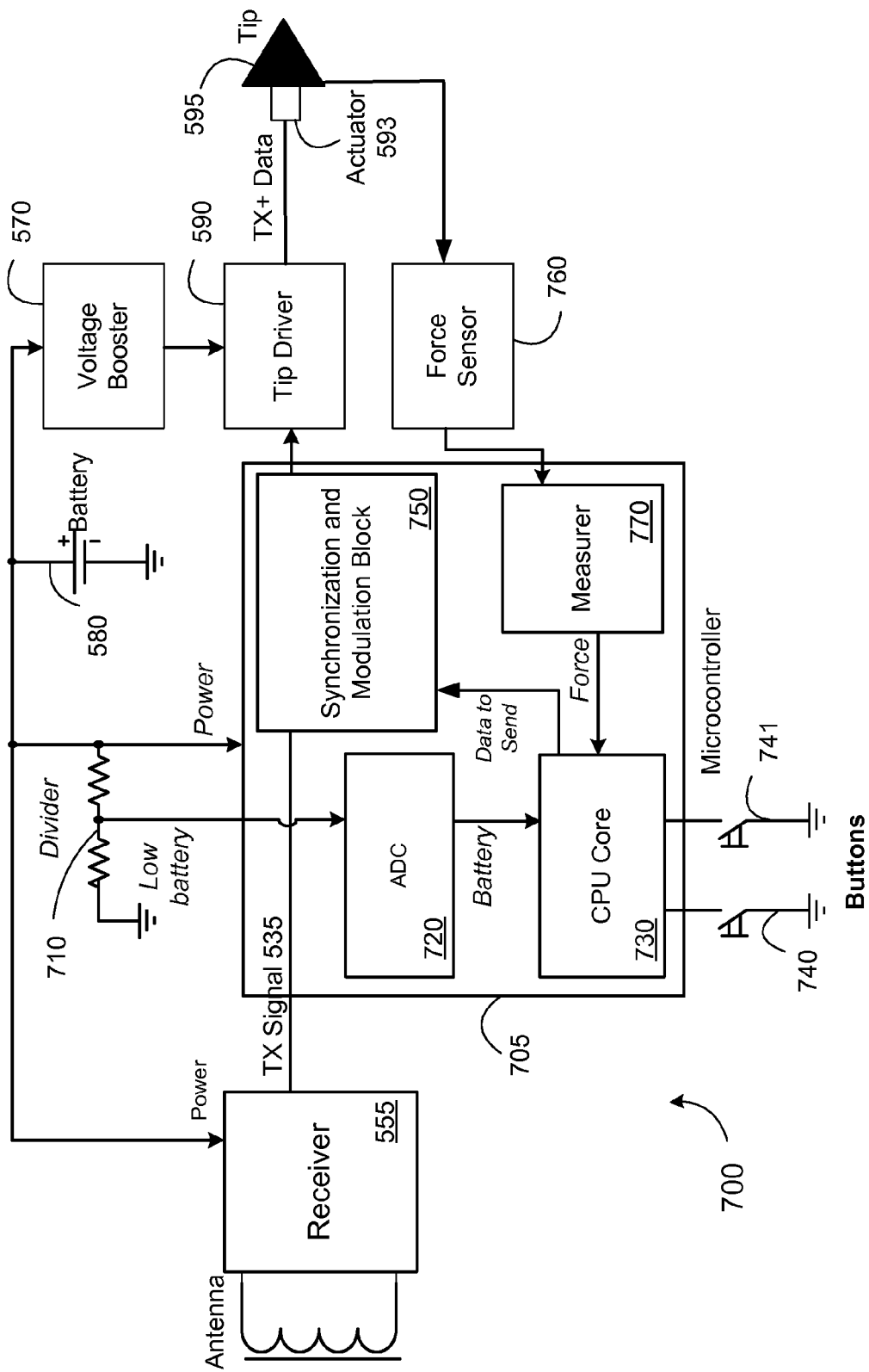
FIG. 7 is a block diagram illustrating one embodiment of a stylus for synchronizing and modulating additional data into a stylus TX signal.

FIG. 7 is a block diagram illustrating one embodiment of a stylus 700 for synchronizing and modulating additional data into a stylus transmit signal 598. The stylus 700 includes a receiver 555, microcontroller block 705, voltage booster 570, battery 580, tip driver 590, actuator 593, stylus tip 595, voltage divider 710, and force sensor 760. In one embodiment, the microcontroller block 705 includes ADC 720, CPU core 730, buttons 740 and 741, synchronization and modulation block ("synch mod block") 750, and measurer 770.

In an embodiment, the synch mod block 750 is configured to modulate additional data into the TX signal 535. Some types of additional data that may be modulated into the stylus TX signal 535 include battery data, acceleration data, button data, force data, and other data as would be appreciated by one of ordinary skill in the art having the benefit of this disclosure.

In one embodiment, if no modulation of additional data is required on the stylus TX signal 598, the stylus 700 operates similar to the stylus block 550 of FIG. 5. In particular, the receiver 555 wirelessly receives the TX signal 535, the synch mod block 750 receives the TX signal 535 from the receiver 555, the tip driver 590 drives or amplifies the TX signal 535, and the stylus tip 595 capacitively couples the amplified stylus TX signal 598 to the sense array 510. In an embodiment, the synch mod block 750 may be bypassed if no modulation of additional data in the stylus TX signal 598 is required.

In an embodiment, the stylus 700 modulates battery data (e.g., battery charge status) into the stylus TX signal 535. In one embodiment, the battery data may be obtained by using a voltage divider and ADC. In particular, the voltage divider 710, which may be a resistor divider network as shown in FIG. 7, measures an analog voltage potential (e.g., at the resistor divider midpoint) of the battery 580, and the ADC 720 converts the measured analog voltage potential to a digital value and sends it to the CPU core 730. The CPU core 730 processes the digital value and sends it to the synch mod block 750. The synch mod block 750 modulates the battery data into the stylus TX signal 535. The tip driver 590, in conjunction with the voltage booster 570, amplifies the modulated stylus TX signal 535. The stylus tip 595 capacitively couples the modulated stylus TX signal 598 to the sense array 510. In other embodiments, the synch mod block 750 may modulate other types of additional data into the stylus TX signal 535 in addition to the battery data, such as button data described below. In other embodiments, the synch mod block 750 may modulate stylus data, such as force sense data, button state data, or the like, into the stylus TX signal 535.

In one embodiment, the stylus 700 includes buttons 740 and 741. Buttons may provide additional functionality to the stylus including, but not limited to, "left click" and "right click" functions, similar to that of a computer mouse. Buttons 740 and 741 of stylus 700 are coupled to the CPU core 730. The buttons 740, 741, may be mechanical, electrical, capacitive, or other types that would be known by one of ordinary skill in the art. The CPU core 730 processes the button input data and sends it to the synch mod block 750. The synch mod block 750 modulates the button data into the stylus TX signal 535. The tip driver 590, in conjunction with the voltage booster 570, amplifies the modulated stylus TX signal 535 and the stylus tip 595 capacitively couples the modulated stylus TX signal 598 to the sense array 510. In an embodiment, the synch mod block 750 may modulate one or more other types of additional data into the stylus TX signal 535 in addition to the button data and/or battery data, such as the force data described below.

In an embodiment, force sensing is implemented in the stylus 700. Force sensing provides additional data relating to the stylus tip 595 contact pressure on the sense array 510. The force sensor 760 detects the force applied to the actuator 593. The measurer 770 determines the amount of force (e.g., magnitude of force signal) applied to the tip 595. The CPU core 730 processes the force signal and sends it to the synch mod block 750. The synch mod block 750 modulates the force data into the stylus TX signal 535. The tip driver 590, in conjunction with the voltage booster 570, amplifies the modulated stylus TX signal 535 and the stylus tip 595 capacitively couples the modulated stylus TX signal 598 to the sense array 510. Force sense may be detected by either a passive sensor (e.g., force sensing resistor) or active sensor (e.g., capacitive linear position sensor or a moving element in relation to a coil) within the stylus 700. Alternatively, other methods may be used to quantitatively determine and digitize a force applied to the stylus tip 595, as would be appreciated by one of ordinary skill in the art. In an embodiment, the synch mod block 750 may modulate one or more other types of additional data into the stylus TX signal 535 in addition to the force data. For example, in another embodiment, the orientation or acceleration of the stylus may be detected (e.g., by an accelerometer) and encoded in the stylus TX signal 535.

In an embodiment, the synch and mod block 750 may modulate the additional data by way of frequency modulation ("FM"), frequency-shift keying ("FSK"), amplitude modulation ("AM"), amplitude-shift keying ("ASK"), on-off keying ("OOK"), pulse position modulation, phase modulation ("PM"), Manchester encoding, direct sequence spread spectrum ("DSSS"), or other modulation schemes that would be appreciated by one of ordinary skill in the art. PM modulation may further include binary phase shift keying ("BPSK"), which are further discussed below with respect to FIGS. 18A-18C, or quadrature phase shift keying ("QPSK") encoding schemes.

Other embodiments may be configured to alternatively transfer additional data from the stylus 700 to the sensing device (not shown) without modulating the stylus TX signal 535. For example, using time division multiplexing ("TDM"), the stylus 700 transmits the stylus TX signal 598 in one time slot, and transmits the additional data (e.g., force data, acceleration data) in another time slot. Similarly, code division multiplying (CDM) may be used to transmit the stylus TX signal and the additional data. The stylus 700 may transmit the stylus TX signal 598 using one code, and may transmit the additional data using another code. In an embodiment, the stylus TX signal 598 and additional data may utilize the same frequency or different frequencies. In other embodiments, optical, ultrasonic, inductive, or RF signal transmissions may be utilized to transfer the additional data from the stylus 700 to the sensing device 530. For example, additional data may be wirelessly coupled from the stylus 700 to the sensing device 530. It should be noted that additional hardware, such as antennas and/or amplifiers, may be required to transmit the additional data to the sensing device 530. Such embodiments would be known by those of ordinary skill in the art with the benefit of this disclosure.

Figure 8:
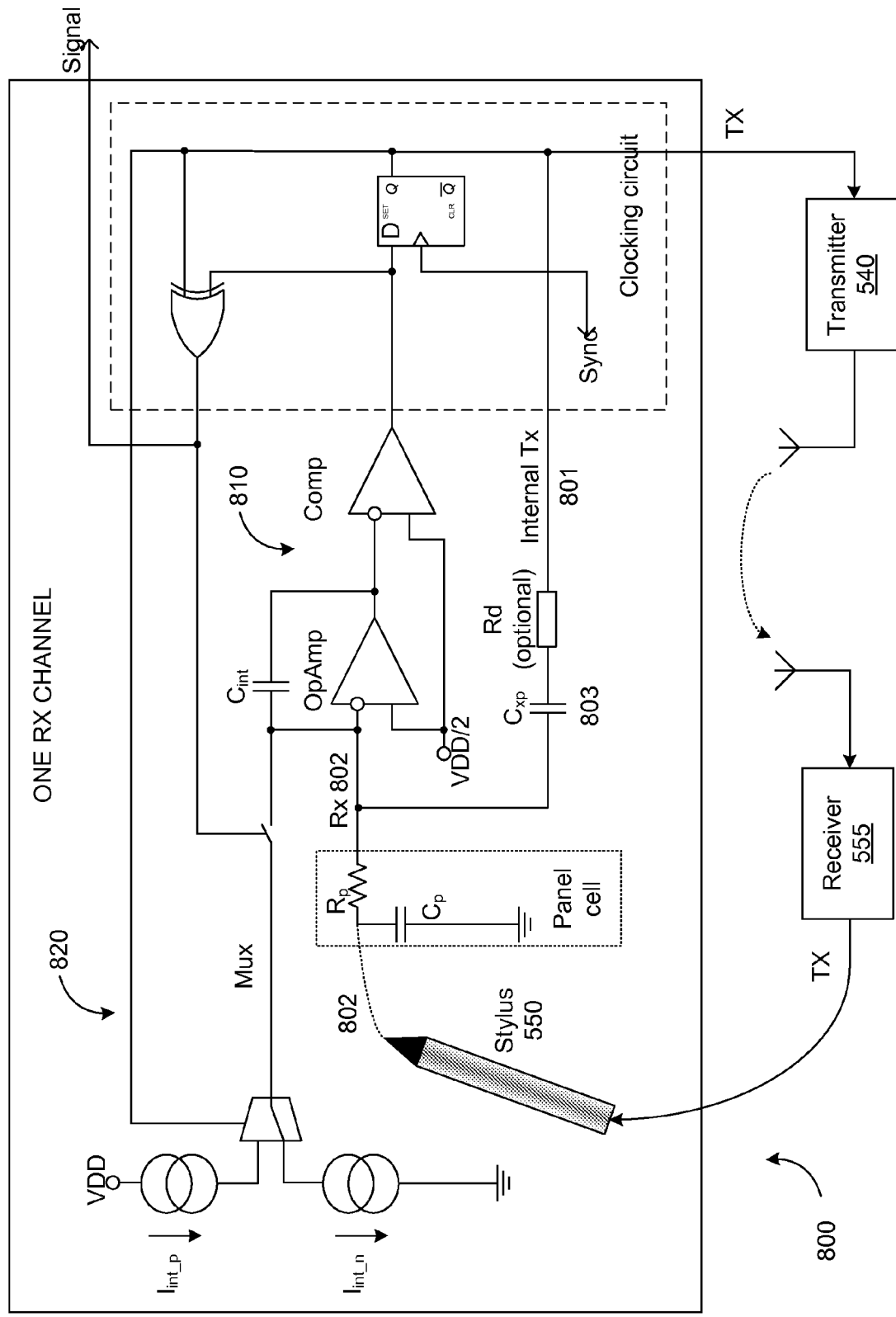
FIG. 8 is a block diagram illustrating one embodiment of on RX channel circuitry.

FIG. 8 is a block diagram illustrating one embodiment of on RX channel circuitry 800. During an APA scan, the one RX channel circuitry 800 includes an integrator circuit 810 and a generator circuit 820. The TX signal can be supplied to the measurement channel (RX 802) in two ways. In one embodiment, the TX signal 801 is applied to the RX channel 802 through a capacitor 803 ($C_{xp}$). The TX signal 8091 trough Cxp capacitor 803 provides enough feedback current for generator operation. In another embodiment, the TX signal 802 is applied to the RX channel 802 through the stylus 550 to panel capacitance. The TX signal 802, as described above with respect to FIG. 5, is transmitted by the transmitter 540 of the host device 505 to the receiver 555 of the stylus 550. The TX signal 802 trough stylus to panel capacitance changes the generator operation frequency that provides information for touch position detection. It should be noted that there is no constant TX path through panel mutual capacitance.

Figure 18C:
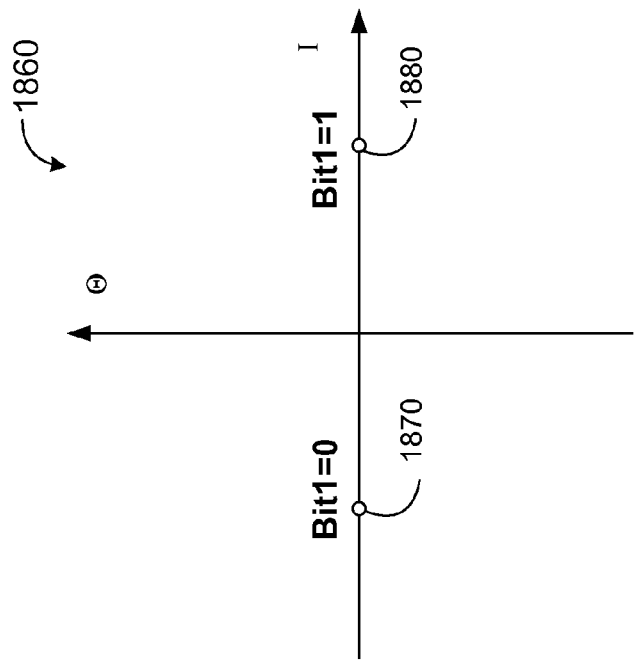
FIG. 18C is a graph illustrating polar coordinates and phase relationships for a one-bit BPSK modulation scheme, according to one embodiment.
Figure 18A:
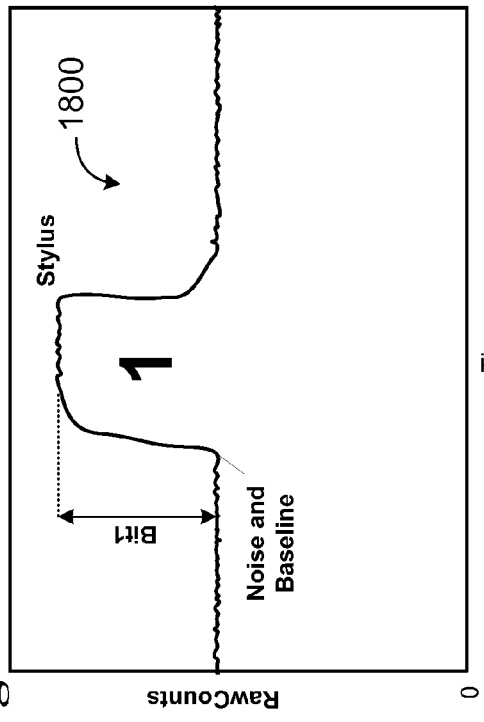
FIG. 18A is a waveform illustrating a stylus TX signal utilizing a one-bit, binary phase shift keyed ("BPSK") modulation scheme, according to one embodiment.
Figure 18B:
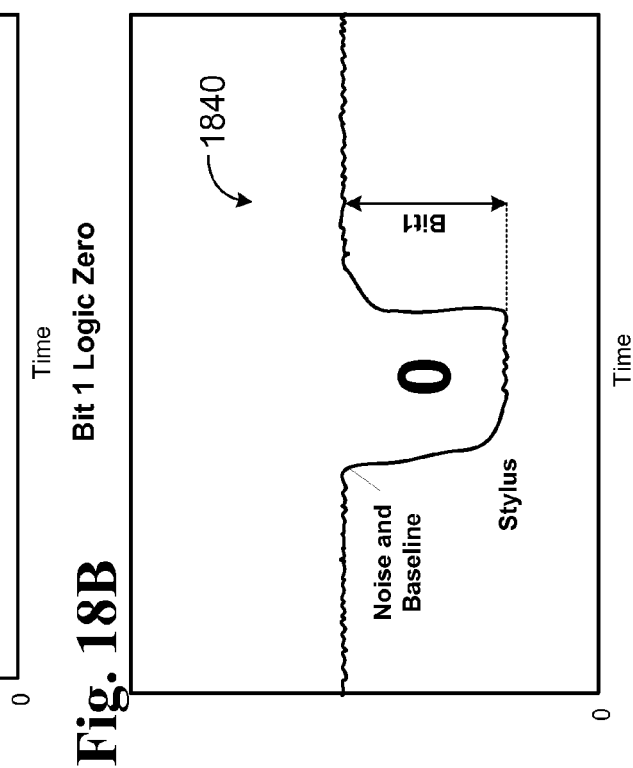
FIG. 18B is a waveform illustrating a stylus TX signal utilizing a one-bit BPSK modulation scheme, according to one embodiment.

In one embodiment, the TX signal phase modulation is used to transmit data from stylus 550 to host device 505. It is based on TX signal inversion/non-inversion on stylus side called BPSK. If not inverted signal is applied to the stylus tip then raw data goes up. If inverted signal is applied to stylus tip then raw data goes down. In both cases, the signal has the same value but different polarity, as illustrated in FIGS. 18A-18C. The polarity changes may indicate that a button is pressed or not, may indicate consist force data bits, or a combination of both.

Figure 9:
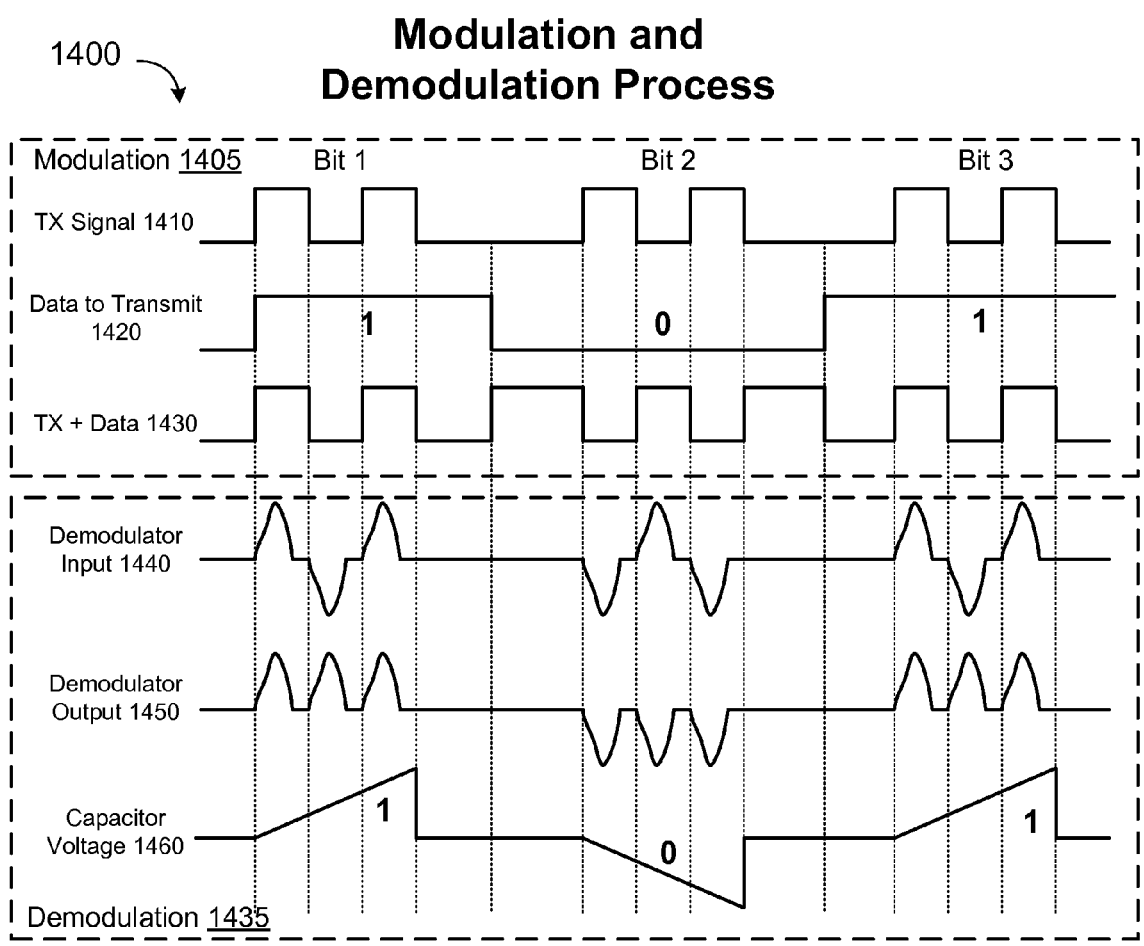
FIG. 9 is a timing diagram illustrating a modulation and demodulation process on a data stream, according to one embodiment.

FIG. 9 is a timing diagram 900 illustrating a modulation and demodulation process on a data stream, according to one embodiment. Timing diagram 900 includes a modulation process 905 and demodulation process 935. The modulation process 905 includes TX data signal 910, data-to-transmit signal 920, and TX+Data signal 930. The demodulation process 935 includes demodulator input signal 940, demodulator output signal 950, and capacitor voltage 960.

In an embodiment, the TX data signal 910 and data-to-transmit signal 920 are a stylus TX signal and stylus data (e.g., force sense, button, and battery data). The TX+Data signal 930 is a modulated TX signal containing information from both the TX signal and the data to transmit (e.g., force data, button data, etc.). In an embodiment, the TX and Data signal 930 pulses are inverted or non-inverted depending on the data-to-transmit signal bits 920. In one embodiment, the TX+Data signal 930 is capacitively coupled from the stylus tip 895 to the ITO panel 510 (or other sense array). Alternatively, the TX+Data signal 930 is wirelessly coupled from the stylus to the sensing device 530.

In an embodiment, the TX+data signal 930 arrives at a demodulator block in the form of current spikes, as illustrated by demodulator input 940. The synchronous detector output signal (demodulator output 950) contains positive or negative rectifier spikes correlating to the modulated additional data. The receiver demodulator integration capacitor (not shown on the circuit diagrams) voltages 960 represent the decoded data bits that correspond to the data-to-transmit 920 signal, which is further processed by the sensing device 530.

Figure 10:
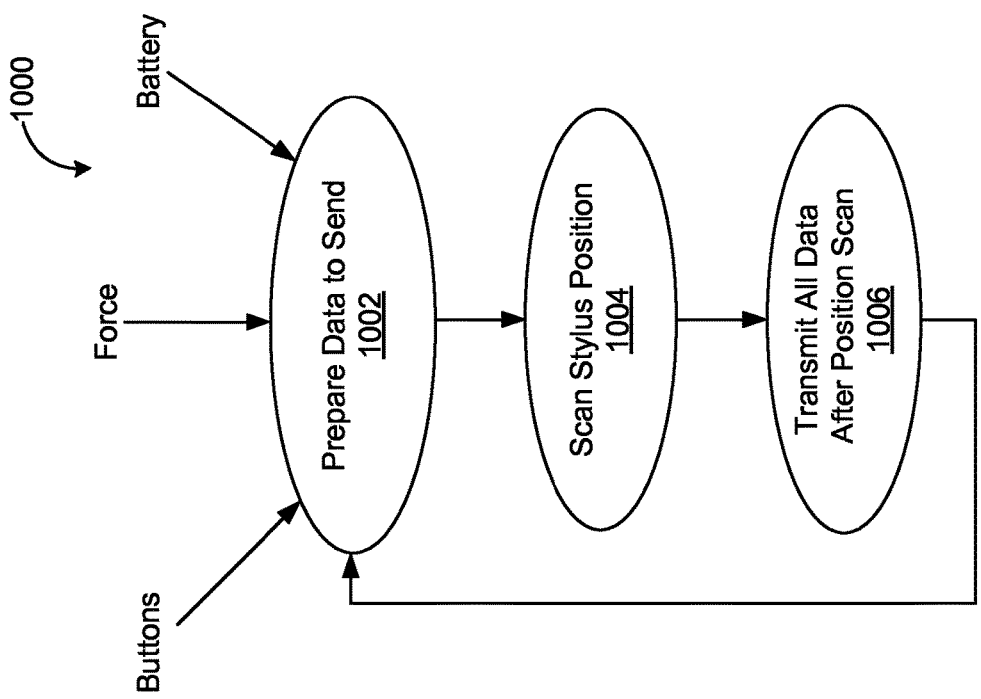
FIG. 10 is a flow chart illustrating a data transfer method and position scanning separated in time according to one embodiment.

FIG. 10 is a flow chart illustrating a data transfer method 1000 and position scanning separated in time according to one embodiment. In this embodiment, the data from the stylus is transmitted to the host device separated in time with a stylus position scan. At the beginning, the method 1000 receives button data, force data, and battery, collectively referred to as stylus data, and prepares the data to send (block 1002). Then the stylus position scan takes place (block 1004), and then the stylus data is transmitted from the stylus to the host device after the position scan (block 1006). The stylus data is transmitted as a separated special scan from the stylus position scan (block 1004).

One related system includes a stylus and a host device uses magnetic field for stylus powering and touch position detection as described in co-pending U.S. application Ser. No. 13/213,895, entitled "Capacitive Stylus with Palm Rejection," filed Aug. 19, 2011. The touch position is calculated based on inductors signals relations. The stylus presence close to some inductors changes its currents. The maximum changes indicate touch position. The inductors are placed behind the screen on the PCB. These inductors are connected to amplifier output and provide the energy for stylus operation. The high frequency carrier are received and on stylus side and is used for self-powering and data transmitting. Energy from the inductors comes to rectifier and power regulator. The regulator output voltage is 3.3V. These voltage feeds to microcontroller and invertors. The microcontroller measures force sensors and buttons states and send it back trough inductor. There are capacitors and jumpers on the board and the inductors are manually tuned to resonance on factory. The two inductors on different stylus edges provide enough power in both drawing and erase modes. This system uses AM for stylus data to host device transmitting, as illustrated in FIG. 11.

Figure 11:
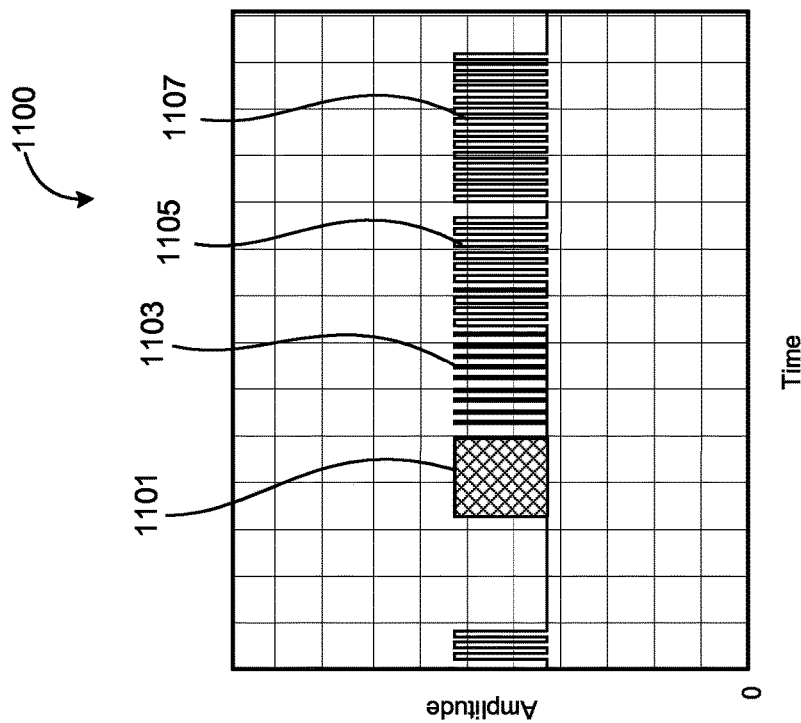
FIG. 11 is a graph illustrating a stylus data transfer according to one embodiment.

FIG. 11 is a graph 1100 illustrating a stylus data transfer according to one embodiment. The graph 1100 illustrates a synchronization and energy transfer 1101 (e.g., 1 msec long), position data 1107, force data 1105 (e.g., nine bits corresponding to the force data), and button data 1103 (2 bits corresponding to button data). The stylus data (force data 1105 and button data 1103 is transmitted before position scan. The force data is transmitted by AM modulation, which may look like RFID. So, stylus modulates inductor Q-factor.

This system, however, may have some disadvantages such as high power consumption, high EMI radiation, long transmitting time, and expensive construction.

Figure 12:
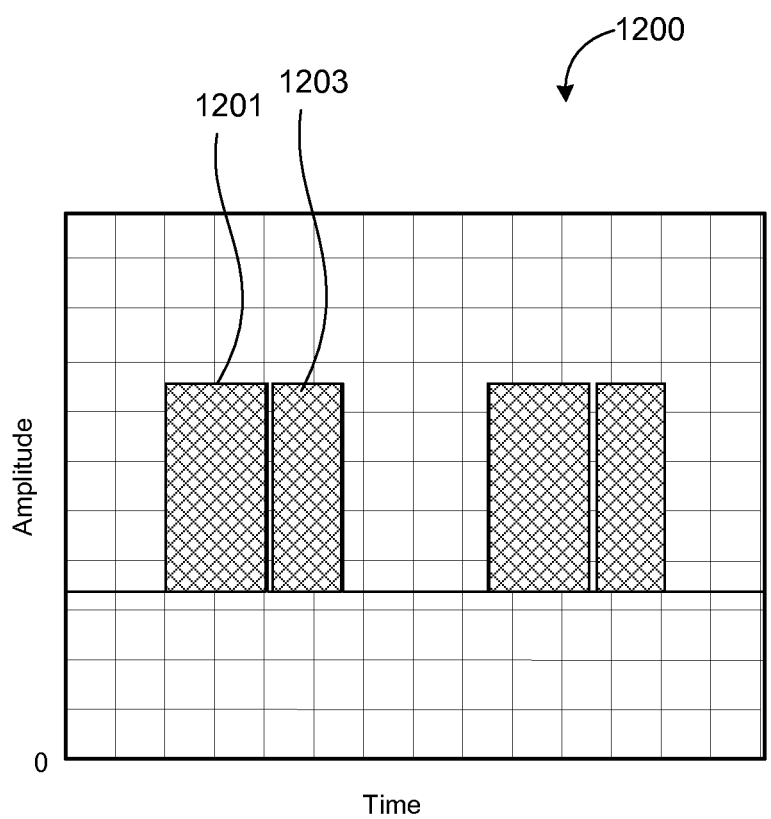
FIG. 12 is a graph illustrating a stylus signal of position and of force.

Another related system includes ITO sensors that are connected to a selective receiver, as described in co-pending U.S. application Ser. No. 13/213,895, entitled "Capacitive Stylus with Palm Rejection," filed Aug. 19, 2011. The ITO line with maximum received signal is the stylus position. The stylus generates a carrier frequency that is amplified and supplied to ITO panel via stylus tip. The signal maximum is touch position. The force data is transmitted by the carrier frequency modulation. The received signal is decoded on host device side and transmits to PC. The stylus is powered from battery. The force sensor data is transmitted after position scan, as illustrated in FIG. 12. This system modulates packet lengths and frequency, and this system may have an advantage of simplicity and potentially robust operation. However, this system may have disadvantages of being a special narrow band receiver and no RF noise immunity.

FIG. 12 is a graph 1200 illustrating a stylus signal of position and of force. The graph 1200 illustrates a position scan 1201 and a force scan 1203 that is transmitted after the position scan 1201.

Figure 13:
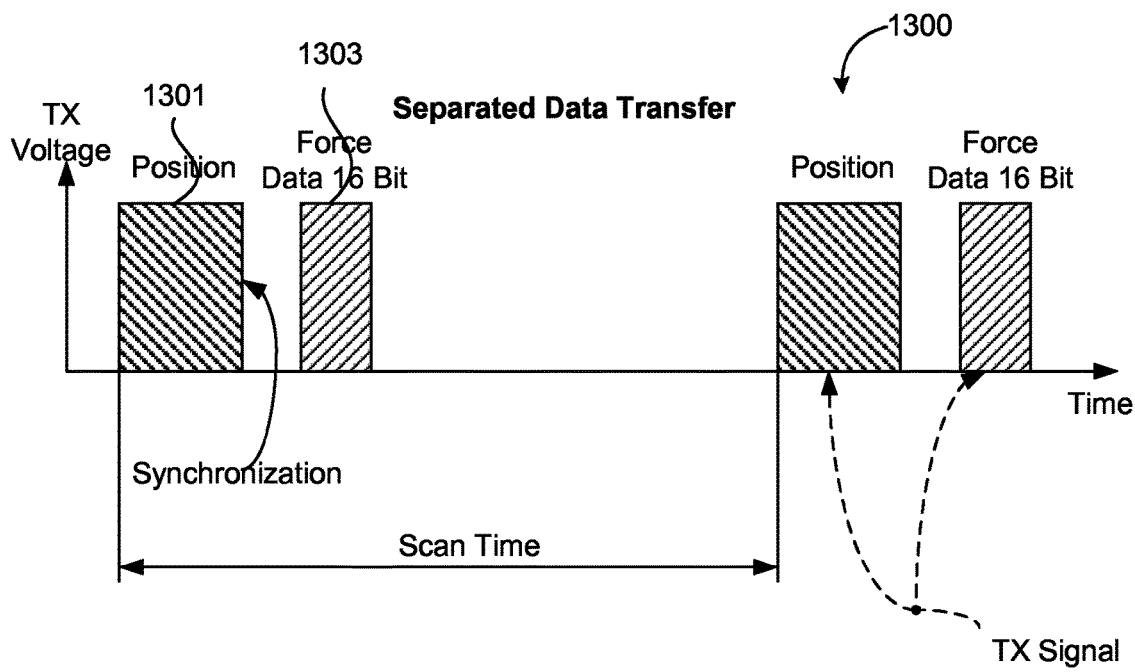
FIG. 13 is a waveform diagram illustrating a data transfer according to one embodiment.

Another related system described in co-pending U.S. application Ser. No. 13/213,895, entitled "Capacitive Stylus with Palm Rejection," filed Aug. 19, 2011 uses a "separated mode," for transmitting stylus data. The idea is sending the data during additional special data scan after main position scan. The data is transmitted separated in time from the position scan, as shown in FIG. 13. In this embodiment, the stylus data bits are transmitted at a time after the stylus position scan in a separated data transfer.

FIG. 13 is a waveform diagram 1300 illustrating a data transfer according to one embodiment. The waveform diagram 1300 illustrates that the force data (e.g., 16 bits) are transmitted after the synchronization and position scan 1301 as separate data transfers. The separated data transmitting may be easier to implement but may increase total stylus position scanning time. This method may need low noise LCD for robust operation because the ITO sensors should be connected together during data scan for fast bits transmitting. The connected together sensors may create a big area that conducts LCD noise. This noise may be applied to the same single measurement channel and may increase raw count noise. The stylus touch signal, however, does not increase as much as the noise. As a result, the signal-to-noise ratio (SNR) may decrease as compared to regular stylus scan when only one electrode is connected to channel.

Figure 14:
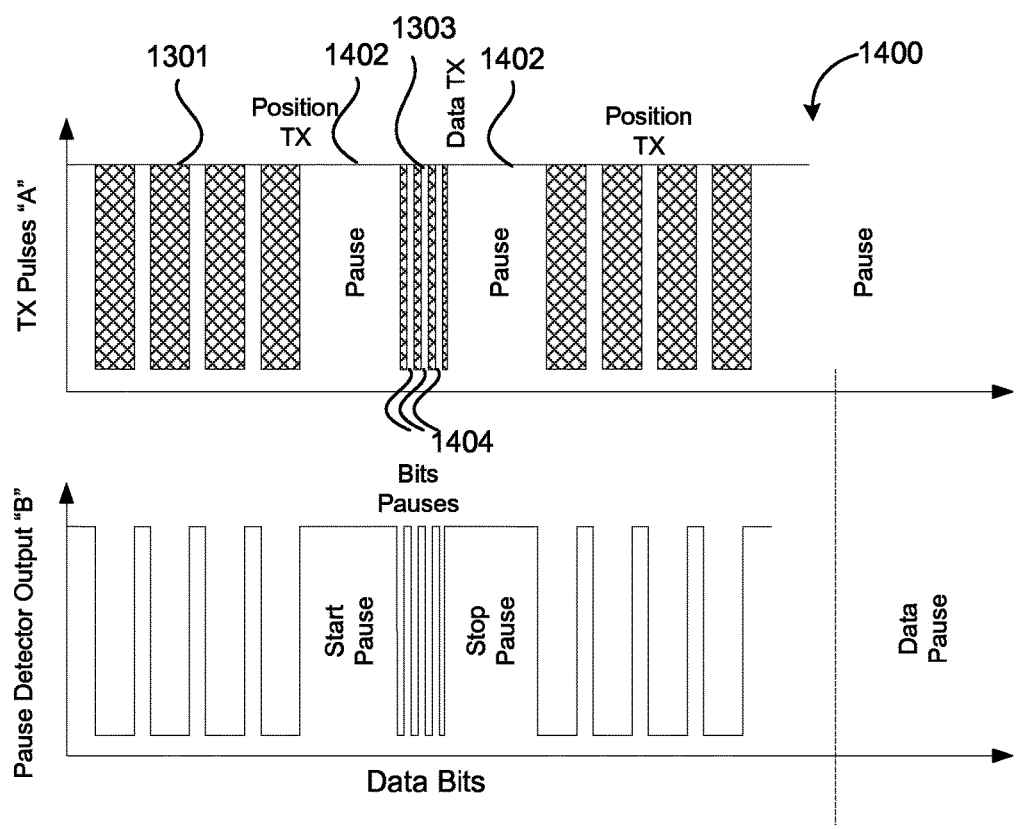
FIG. 14 is a waveform diagram illustrating a pause detector operation according to one embodiment.

In one embodiment, special short TX pulses may be used for data transmitting in the separated mode as illustrated in FIG. 14.

FIG. 14 is a waveform diagram illustrating a pause detector operation according to one embodiment. The pause detector is configured to detect long pauses 1402 and short pauses 1404. The TX signal for data 1303 packet length may be shorter then TX signal for normal position scan 1301. The shorter pulses 1303 provides enough touch signal SNR for robust bits detection from one side and may not spend too much time from other side. The longer scans for data may be better than shorter pulses, but may increase total scan time. The short pulses 1404 may allow a short conversion where each conversion is one data bit. One long conversion instead a lot of short conversions is used for position detection (as shown by 1301). The longer conversions may be used to get high position resolution and low noise. Therefore, one or two bits only can be transferred during this. The pause detector is configured to obtain a TX signal envelope. The synchronization circuit uses this envelope for clock pulses generation. The pause detector may be a simple amplitude detector circuit. The output of the pause detector is also shown in FIG. 14.

Figure 15:
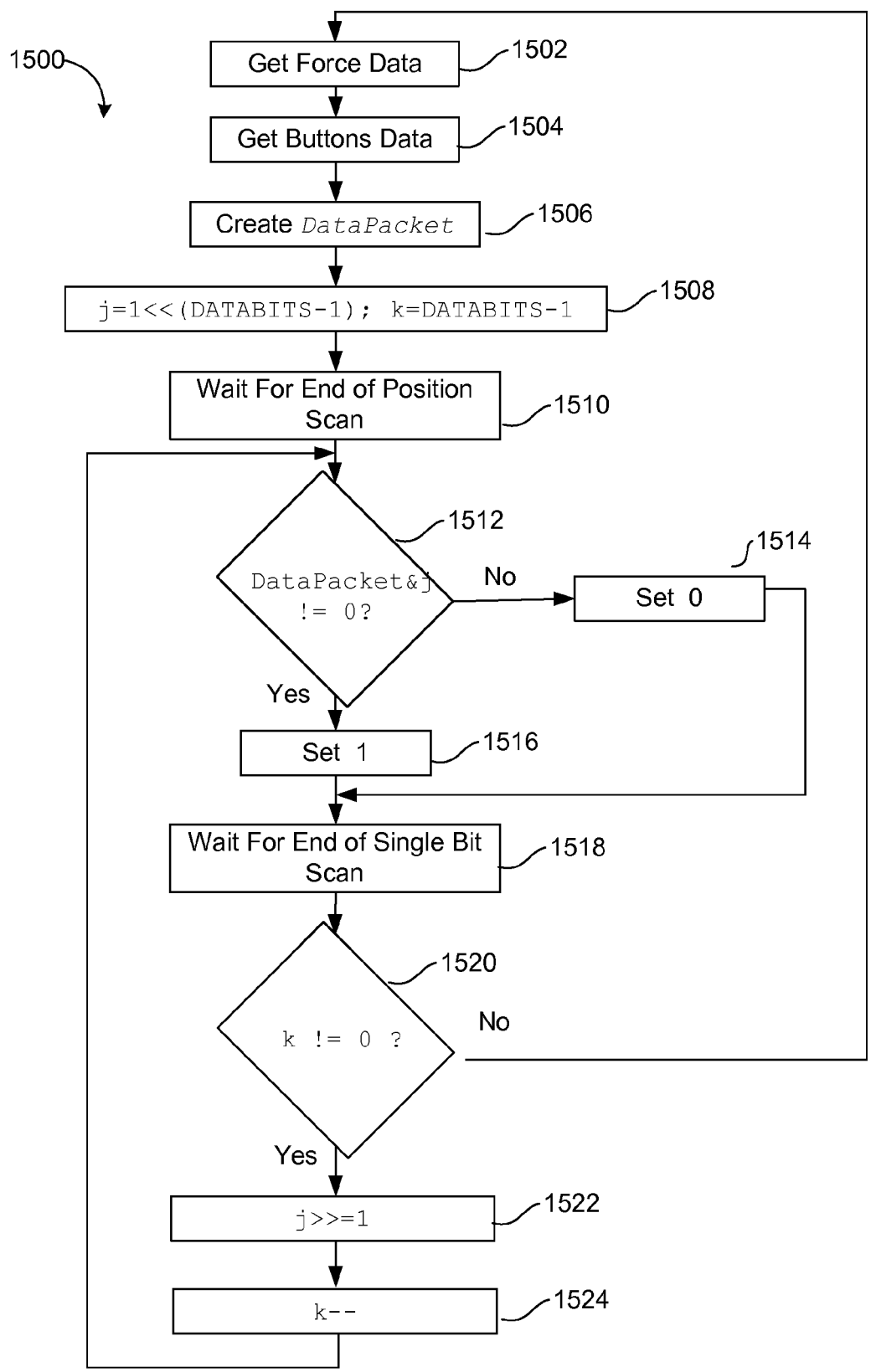
FIG. 15 is a flow chart illustrating one embodiment of a stylus operation.

FIG. 15 is a flow chart illustrating one embodiment of a method 1500 of a stylus operation. In this embodiment, there are three main parts to the stylus operation algorithm: 1) Measure force and prepare data packet; 2) Wait for long pulse; and 3) Transmit the data. At the beginning the stylus measures force sensor value (block 1502), gets buttons status (1504), calculates the checksum and puts all of this in single two-bytes variable (block 1506). The processing logic initializes received bits counter "k" and individual receiver bit position in data packet "j" (block 1508). Then stylus waits for end of possible scan and sets MSB bit (block 1510). When stylus is detected by host device, this bit transmitting occurs. The next step is to wait for a long pause. This pause indicates start of packet. If long pause is detected then stylus goes to the data transmitting part. At block 1512, the processing logic analyzes each individual bit in "DataPacket." If this bit is zero then modulator sets to zero in 1514. If this bit is logic high then modulator sends to transmit 1 at block 1516. Then the processing logic waits for end of current single bit transmitting that means end of current scan at block 1518. The total amount of bits to send is checked at block 1520. If not all the bits are sent, then processing logic continues transmitting, and returns to block 1522. The individual bit counter "j" and total data to send "k" are updated at blocks 1522 and 1524 accordingly.

As described above, there are disadvantage of resistive touch screens and tethered active stylus approaches. As a result, touch screens are migrating to mutual capacitance sensing, or a combination of self and mutual capacitance sensing. Various embodiments described herein are related to synchronous stylus to host device data transmitting. The synchronization channel between stylus and host device is needed since the touch screen control is also used as a receiver for the stylus signals. For example, a multi-channel receiver has the same frequency and phase characteristic as synchronous detector. The synchronous detector uses the presence of the reference demodulation signal. This means the demodulator and input signals should be frequency and phase aligned. Also, for applications that use palm rejection, such as described in co-pending U.S. application Ser. No. 13/213,895, entitled "Capacitive Stylus with Palm Rejection," filed Aug. 19, 2011, the stylus should be an active stylus. In this case, a TX signal should be supplied by stylus tip, not to ITO panel. Also, these applications can use wireless technology to transmit the TX signal to the stylus instead of using a tethered stylus. As described herein, there are several ways of TX signal transmitting. For example, the TX signal can be transmitted by radio, inductively, optically, or other methods of communication. The transmitter can modulate a high frequency carrier signal (e.g., 433 MHz, 900 MHz, or 2.4 GHz) with the TX signal, which typically has a lower frequency than the carrier frequency. The radio receiver on stylus side recovers the TX signal and supply to stylus tip after some amplification. The RF radio link is simple, robust and can use various known methods, but may suffer from one possible disadvantage—power consumption. The receiver may consume a lot of power that limits build-in battery life of the stylus. The inductive coupling between host device and stylus allows building low power receiver due to higher then in radio input signal value. The main difference between radio and inductive technology is antenna construction and operation frequency. The inductive coupled stylus typically used lower RFID frequencies that may not require licensing. The embodiments described below describe various methods for transmitting stylus data from the stylus to the host device. These embodiments transmit the stylus data during the coordinate scans, instead of after the coordinate scans as a separate scan as described above.

Figure 16:
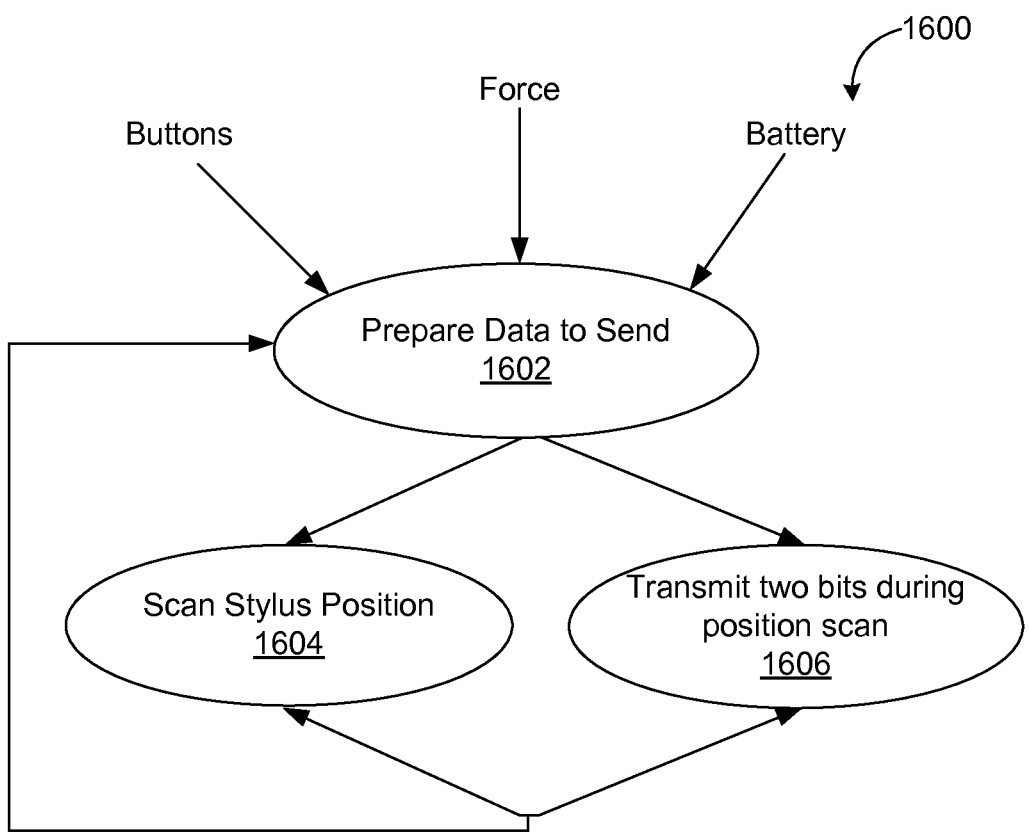
FIG. 16 is a flow chart illustrating a data transfer method and position scanning simultaneous in time according to one embodiment.

FIG. 16 is a flow chart illustrating a data transfer method 1600 and position scanning simultaneous in time according to one embodiment. In this embodiment, the data from the stylus is transmitted to the host device during the coordinate scans. The data transfer of the stylus data may be done simultaneously or at least concurrently with the position scans of the stylus. At the beginning, the method 1600 receives button data, force data, and battery, collectively referred to as stylus data, and prepares the data to send (block 1602). Then the stylus position scan takes place (block 1604), and during the stylus position scan at block 1604, the stylus data is transmitted from the stylus to the host device (block 1606). The stylus data is not transmitted as a separated special scan from the stylus position scan as described above with respect to FIG. 10.

The method 1600 may be performed by processing logic that may comprise hardware (circuitry, dedicated logic, etc.), software (such as is run on a general purpose computing system or a dedicated machine), firmware (embedded software), or any combination thereof. In one embodiment, the controller 224 of FIG. 2 or FIG. 3 performs some of operations of method 1600. In another embodiment, the stylus 550 of FIG. 5 performs the method 1600. In yet another embodiment, the stylus 130 of FIG. 1 performs the method 1600. Alternatively, other components of the electronic system 100 (FIG. 1) can perform some or all of the operations of method 1600.

In one embodiment, the processing logic receives, at a stylus, an indication that a host device is performing a first coordinate scan to determine coordinates of the stylus proximate to a capacitive sense array of the host device. While the host device is performing the first coordinate scan, the processing logic transmits at least two bits of stylus data to the host device. As described herein the stylus data may include force sensor data, button data, battery data, or the like. In yet a further embodiment, the processing logic receives, at the stylus, a second indication that the host device is performing a second coordinate scan to determine second coordinates of the stylus proximate to the capacitive sense array. While the host device is performing the second coordinate scan, the processing logic transmits two more bits of the stylus data. In one exemplary embodiment, the processing logic obtains the stylus data, such as by measuring a force sensor value, obtaining a button status of one or more buttons of the stylus. The processing logic creates a packet with the stylus data (e.g., force sensor value and the button status), and transmits the packet according to at least two bits of data per coordinate scan. In an exemplary embodiment, the processing logic calculates a checksum of the force sensor value and the button status and puts the checksum in the packet.

In another embodiment, the processing logic transmits the two additional bits by transmitting the bits separated by a first pause. The processing logic transmits the packet by transmitting the packet separated by a second pause. The second pause is longer than the first pause.

In another embodiment, the first coordinate scan includes a row scan and a column scan, and the two bits are transmitted by the processing logic by transmitting a first bit of the two bits while performing the row scan, and transmitting a second bit of the two bits while performing the column scan.

In another embodiment, the packet is a full packet format. In another embodiment, the packet is a relative packet format. The full and relative packet formats are described below with respect to FIGS. 26-32. In one embodiment of transmitting relative packets, the processing logic transmits a first packet with a full packet format, the first packet including a value of the stylus data. The processing logic transmits a subsequent relative packet with a relative packet format, the subsequent relative packet including a difference between a previous force data value of the stylus data and a subsequent data value of subsequent stylus data.

In one embodiment, the packet includes at least ten bits, including at least eight bits of force sensor data, at least one bit for button data, and at least one bit for error check information (e.g., cyclic redundancy check (CRC), parity information or the like). In one embodiment, the packet includes at least four bits, including at least two bits of force sensor data, at least one bit for button data, and at least one bit for error check information. Alternatively, the packet may include more or less bits than ten.

The separate data transfer method and the simultaneous data transfer method are compared below in the following Table 1. As shown in Table 1, both methods have possible advantages and disadvantages.

TABLE 1

Data Transmitting Methods Comparison

| Parameter | Data Transmitting | |
|---|---|---|
| | Separated | Simultaneous |
| Stylus Scanning Speed | Decreasing | No Changes |
| Data Rate Speed | High | Low |
| Data LCD Noise Immunity | Low | High |
| External Noise Immunity | High | High |

Figure 17:
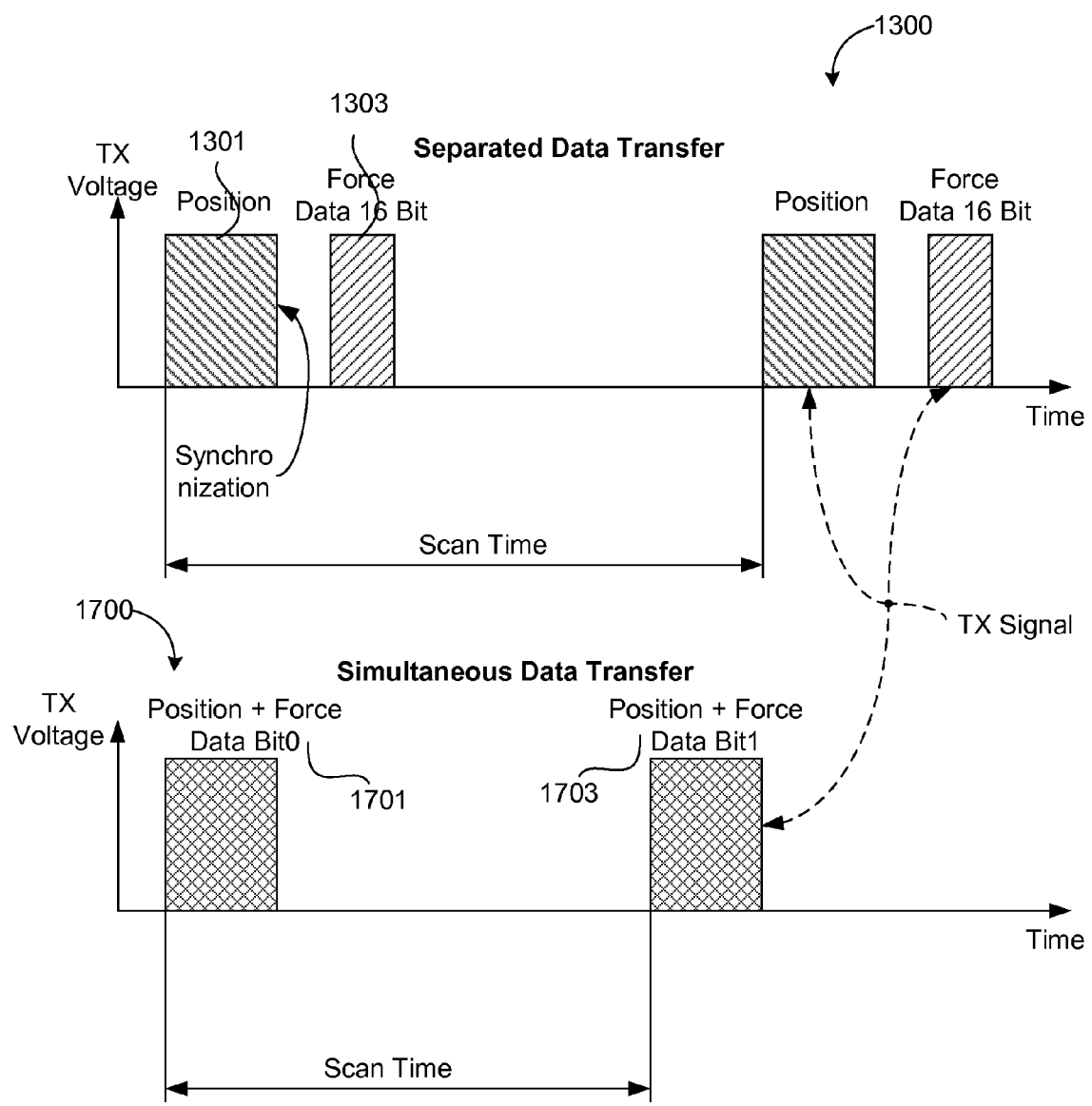
FIG. 17 are waveform diagram illustrating the separated data transfer of FIG. 13 and a simultaneous data transfer according to one embodiment.

FIG. 17 are waveform diagram illustrating the separated data transfer of FIG. 13 and a simultaneous data transfer 1700 according to one embodiment. This figure shows that the data can be transmitted separated in time from the position scan as shown in the waveform diagram 1300 or simultaneously as shown in the waveform 1700. As described above, the data bits of the stylus data 1303 can be transmitted at a time after the stylus position scan 1301. However, in the simultaneous data transfer 1700, the position and stylus data are performed simultaneously with one bit per scan transmitted simultaneously with the stylus position scan. In particular, a first force data bit0 1701 is transmitted during a first scan, and a second force data bit1 1702 is transmitted during a second scan. In another embodiment, at least two bits per scan can be achieved.

It should be noted that the separate data transmitting 1300 may be easier to implement than the simultaneous data transmitting 1700, but may increase the total stylus position scanning time. Also, the separated data transmitting 130 may need low LCD noise for robust operation as described above. The simultaneous data transmitting 1700 may have the same SNR for transmitting stylus data and for position data. This method also may provide a robust, but possibly slower data transmission. The data report rate may be defined by the following equation (1)

$$\text{Data Report Rate} = \frac{\text{Stylus Report Rate}}{\text{Number of Bits}} \quad (1)$$

The simultaneous data transmitting 1700 may be suitable when stylus position scanning time is much smaller then required data rate or when few bits only need to be transmitted. For example, the some conventional stylus solutions have a force data report rate of 20 msec. The embodiments described herein can provide a position report rate of 2 mS. Thus, 10 bits of data can be transmitted to the host device within the same 20 msec period. In addition, the simultaneous data transfer method may have an advantage of a lower bit rate, which requires lower CPU load on the processing device of the stylus. This may allow the use of lower CPU speeds to save battery power. For example, the CPU speed in separated data+position approach may be 24 MHZ, whereas the CPU speed in the simultaneous data+position approach may be 3 MHZ only. Of course, other CPU speeds may be used as would be appreciated by one of ordinary skill in the art having the benefit of this disclosure. It should also be noted that both of these data transfer methods (1300 and 1700) may be used together. For example, the simultaneous method may be used for slow data transmitting like battery voltage or force sensor update and the separated method may be used for fast data like a force on/off state, buttons, and initial force value transmitting. In these embodiments, the few bits may not increase the total position report rate too much.

In short, the TX signal phase modulation may be used to transmit data from stylus to host device. It is based on TX signal inversion/non-inversion on stylus side called BPSK. If not inverted signal is applied to the stylus tip then raw data goes up. If inverted signal is applied to stylus tip then raw data goes down. In both cases, the signal has the same value but different polarity, as described and illustrated with respect to FIGS. 18A-18C. The polarity changes can indicates is button pressed or not, or consist force data bits. As described above with respect to FIG. 7, the stylus design have force sensor, low battery indicator and buttons scanning features. Data is transmitted trough ITO panel and received and decoded on the host device side. The synchronization and modulation block 750 may change the tip signal parameters according to stylus data that needs to be transmitted.

FIG. 18A is a waveform 1800 illustrating a stylus TX signal utilizing a one-bit, binary phase shift keyed ("BPSK") modulation scheme, according to one embodiment. BPSK utilizes one bit with two logic states (binary signal) which are represented as positive and negative pulses that are 180 degrees out of phase with each other. Waveform 1800 illustrates a logic pulse representing a logic level "1." FIG. 18B is a waveform 1840 illustrating a stylus TX signal utilizing a one-bit BPSK modulation scheme, according to one embodiment. Waveform 1840 illustrates a logic pulse representing a logic level "0." FIG. 18C is a graph 1860 illustrating polar coordinates and phase relationships for a one-bit BPSK modulation scheme, according to one embodiment. In an embodiment, a single bit ("Bit 1") may be represented as a positive or negative signal. Bit 1 1880 is a logic level "1" with a zero degree phase shift. Bit 1 1870 is a logic level "0" with a 180 degree phase shift. In an embodiment, BPSK may be used to modulate additional data into the stylus TX signal 598 as described above with reference to FIG. 5. For example, button data may be encoded by BPSK. A pressed and non-pressed button is represented in polar coordinates by Bit 1 1870 and Bit 1 1880, respectively. It should be noted that changing the phase of the TX signal to incorporate additional data will not necessarily change the timing, absolute magnitude, or frequency of the TX signal. In other words, the timing and synchronization information contained in the stylus TX signal 598 may remain unchanged despite a change in signal phase. As described above, BPSK modulation is one of several preferred modulation schemes for adding additional data to a stylus TX signal. BPSK may allow for reliable detection at a low signal-to-noise ratio and may reduce data transmission overhead for a stylus. Other modulation schemes may be used as would be known by one of ordinary skill in the art with the benefit of this disclosure.

As above, the pauses between position scans are used for bits and packets separation. The short pauses may be used for individual bits separation and the long pauses may be used as packet separators as illustrated and described with respect to FIG. 19.

Figure 19:
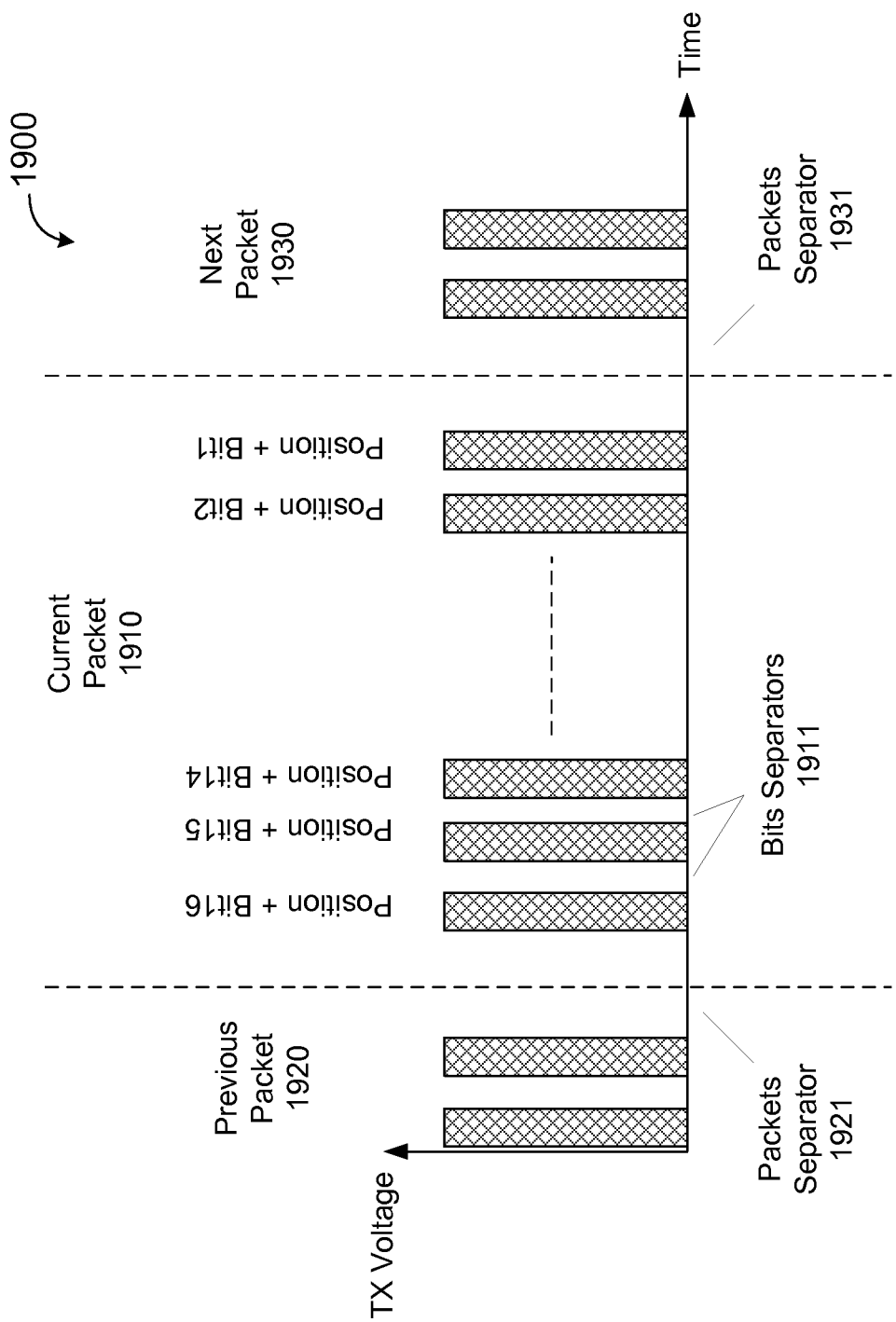
FIG. 19 is a waveform diagram illustrating pauses for packets and bits separation according to one embodiment.
Figure 20:
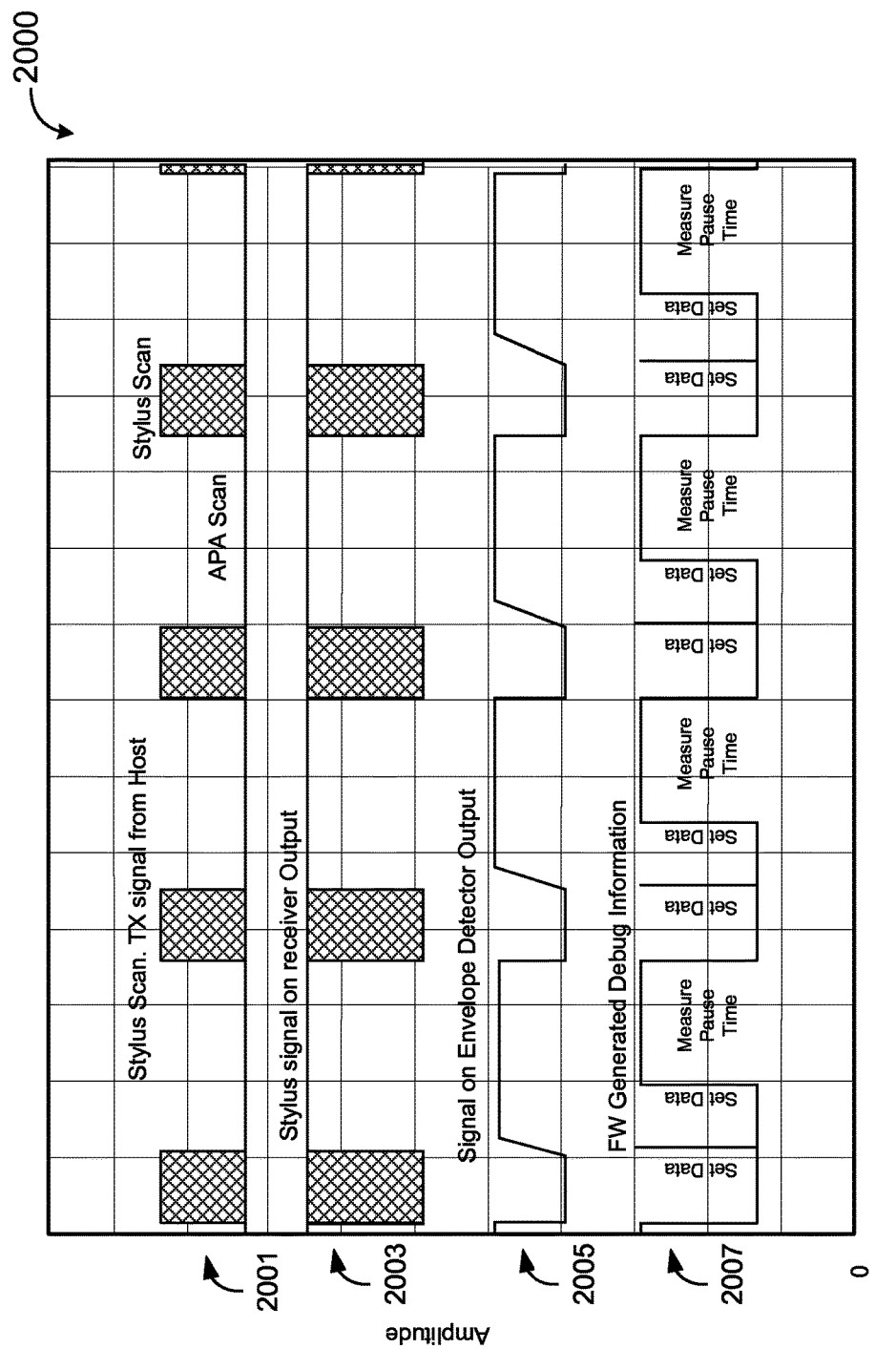
FIG. 20 is a waveform diagram illustrating a host device in APA mode according to one embodiment.

FIG. 19 is a waveform diagram 1900 illustrating pauses for packets and bits separation according to one embodiment. Diagram 1900 includes three packets, a current packet 1910, a previous packet 1920, and a next packet 1930. There are packet separators 1921 and 1931 between the previous packet 1920, the current packet 1910, and the next packet 1930, respectively. Also, as labeled in the current packet 1910, there are bit separators 1911 between each of the bits. The packets separators 1921, 1931 and bit separators 1911 are generated by the host device. For example, firmware of the host device or a digital sequencer of the host device generates pauses between scans. The pauses for the bit separators 1911 are short and do not affect the total coordinate report rate, as compared to the longer pauses of the packet separators 1921. For example, the longer pauses of the packet separators 1921 may be two or three times longer than the short pauses of the bit separators 1911. The longer pauses may also be used as a start of packet or an end of packet indicator. In one embodiment, the longer pauses happen during APA scans if a stylus is not detected. Simulated test results of when the stylus is not detected by the host device are shown in FIG. 20. The stylus may receive a TX signal from host device and synchronizes to it before hover touch is detected. One embodiment of the data coding algorithm is shown in FIG. 21A-21B.

FIG. 20 is a waveform diagram 2000 illustrating a host device in APA mode according to one embodiment. Diagram 2000 shows the TX signal 2001 transmitted from the host device, a stylus signal 2003 on a stylus receiver output, a signal 2005 on an envelop detector output, and an operation 2007 performed by firmware in response to the signal, including setting the data bits, and measuring pause times. The "Signal Envelope" point in stylus schematic is equivalent to pause detector output. The debug information shows the data assigning points and packet synchronization. FIG. 20 shows the time when stylus assigns the data, when it is looks for a next bit scanning (short pause) and when it returns.

In one embodiment, the stylus operation algorithm includes three main parts: 1) Measure force and prepare data packet; 2) Wait for long pulse; and 3) Transmit the data.

Figure 21A:
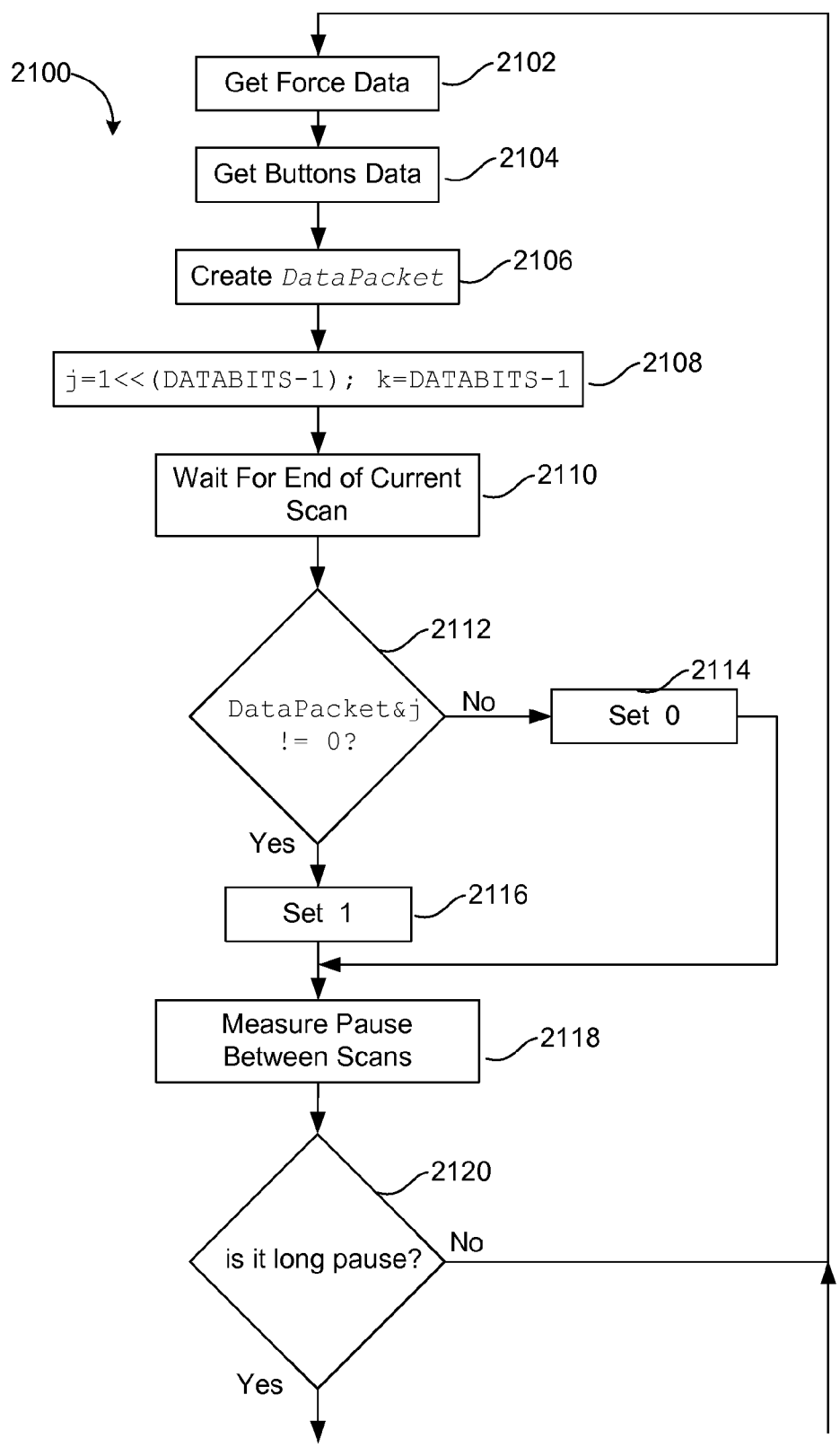
FIGS. 21A and 21B are flow charts illustrating one embodiment of a method of a stylus operation.
Figure 21B:
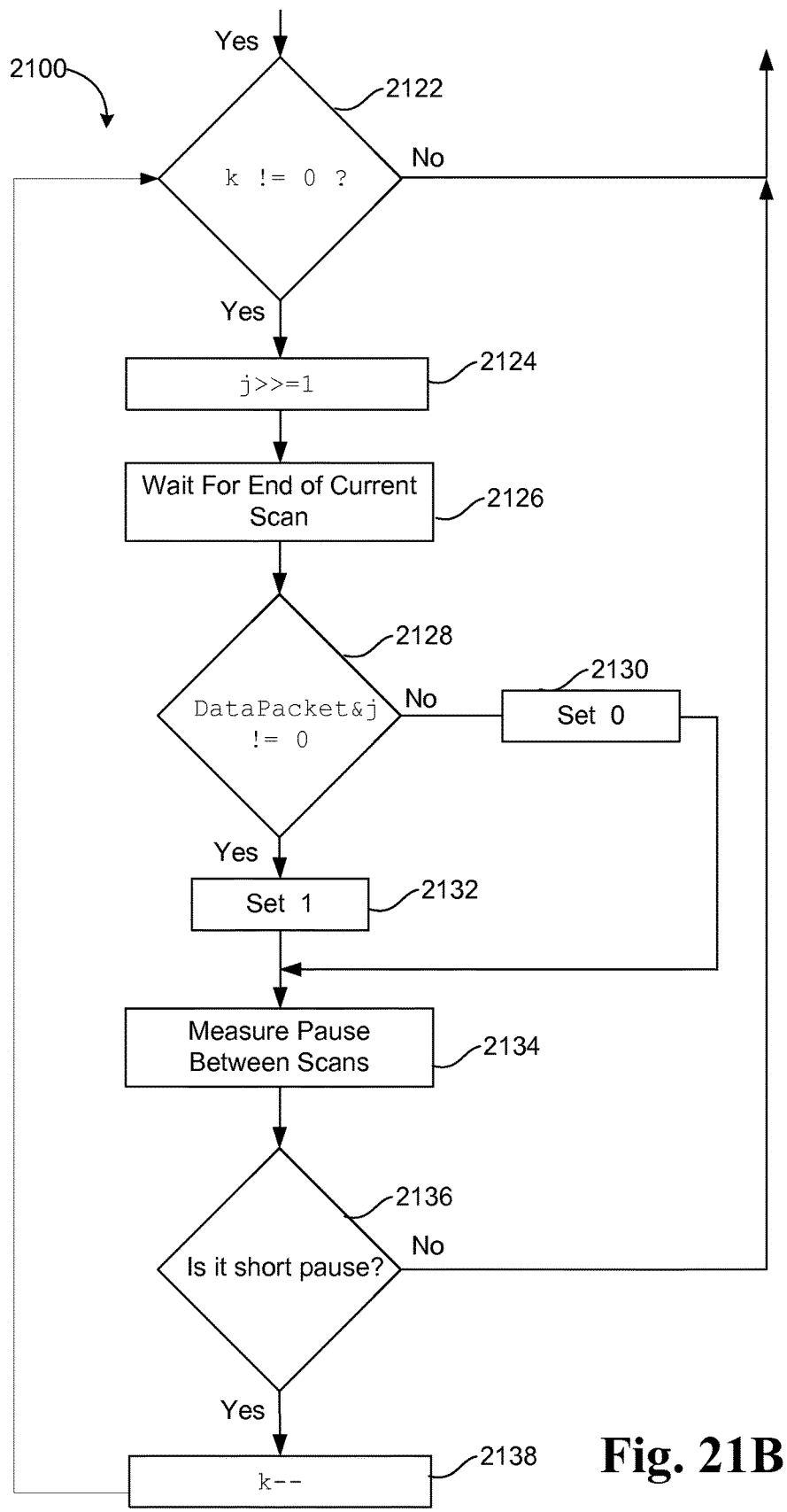

FIGS. 21A and 21B are flow charts illustrating one embodiment of a method 2100 of a stylus operation. The method 2100 is performed by processing logic that may comprise hardware (circuitry, dedicated logic, etc.), software (such as is run on a general purpose computing system or a dedicated machine), firmware (embedded software), or any combination thereof. In one embodiment, the controller 224 of FIG. 2 or FIG. 3 performs some of operations of method 2100. In another embodiment, the stylus 550 of FIG. 5 performs the method 2100. In yet another embodiment, the stylus 130 of FIG. 1 performs the method 2100. Alternatively, other components of the electronic system 100 (FIG. 1) can perform some or all of the operations of method 2100.

Referring to FIGS. 21A and 21B, the processing logic begins measuring force sensor values (block 2102), obtaining one or more button statuses (block 2104), and calculates a checksum of the force sensor values and the button statuses. The processing logic creates a packet (block 2106) with the checksum. In one embodiment, the processing logic calculates the checksum and puts all of this into a single two-byte variable. The processing logic initializes received bits counter "k" and individual receiver bit position in data packet "j" (block 1508). Then stylus waits for end of possible scan and sets MSB bit (bock 2110). When stylus is detected by host device, this bit transmitting will have been done. The next step is to wait for a long pause. This pause indicates start of packet. If long pause is detected then stylus goes to the data transmitting part. The long pause may happen between packet scans or between any APA scan. If data transmitting is not started yet then the long pause may happen after each stylus scan. That's why "end of current scan" means waiting for a long pause. One transmitting rule that can be used in this method is "Do not change the data during coordinate scan" because it may affect the stylus position value. At block 2112, the processing logic check is all bits are send or not. When all the bits are sent, then the "k" is equal to zero. As such, the processing logic waits for end of scan after a long pause and then sets next bit (blocks 2114 and 2116). Also, stylus decrements bit counter that indicates end of packet. The processing logic measures pause time between scans (block 2118). The processing logic determines if the pause is a long pause (block 2120). If it is a long pause (not a short pause), then stylus tip may not be proximate to the panel, and the host device cannot detect the stylus. In such cause, the processing logic has enough time during the long pause for returning to the top of the algorithm at block 2102, and repeating the operations at blocks 2102-2120. However, if at block 2120, the processing logic determines that it is a short pause, then the processing logic determine if the bit counter is zero. If it is a short pause and the bit counter is not zero, then the processing logic repeats the last two operations with the next data bit (a second data bit). The algorithm starts from block 2102. The force sensor is measured at block 2102. The buttons are measured at block 2104. Then the all data include CRC, battery and any additional data is formed at block 2106. The bites counter "k" and bit position "j" initializing at block 2108. Then the processing logic waits for end of current scan if it is presented. At block 2112, the processing logic analyzes each individual bit in "DataPacket." If this bit is zero then modulator sets to zero at block 2114. If this bit is logic high then modulator sends to transmit 1 at block 2116. Next, the processing logic measures pause between end of previous scan and start of new scan at block 2120. The long pause means start of data transmitting. The short pause means that needs check next pause. If it is a long pause then main data transmitting starting. The total amount of bits checked at block 2122. The first bit to send was set at block 2112. So, the bit position pointer "j" shifted to next position. Then the processing logic waits for end of current single bit transmitting that means end of current scan at block 2126. At block 2118, the processing logic analyzes each individual bit in "DataPacket." If this bit is zero then modulator sets to zero at block 2130. If this bit is logic high then modulator sends to transmit 1 at block 2132. Next, the processing logic measures pause between end of previous scan and start of new scan at block 2134. The long pause means end of data transmitting and all data are send. If pause is short then the processing logic decrease bits to send counter at block 2138 and returns back to block 2122. In one embodiment, the measurements and waiting cycles have time limiters. These limiters return code execution to start point if no action occurs for some predefined period of time. This may help protect the stylus from hangs if no host device signals are received or strong external RF noise is presented. These limiters can be used for power management in the stylus design.

Figure 22A:
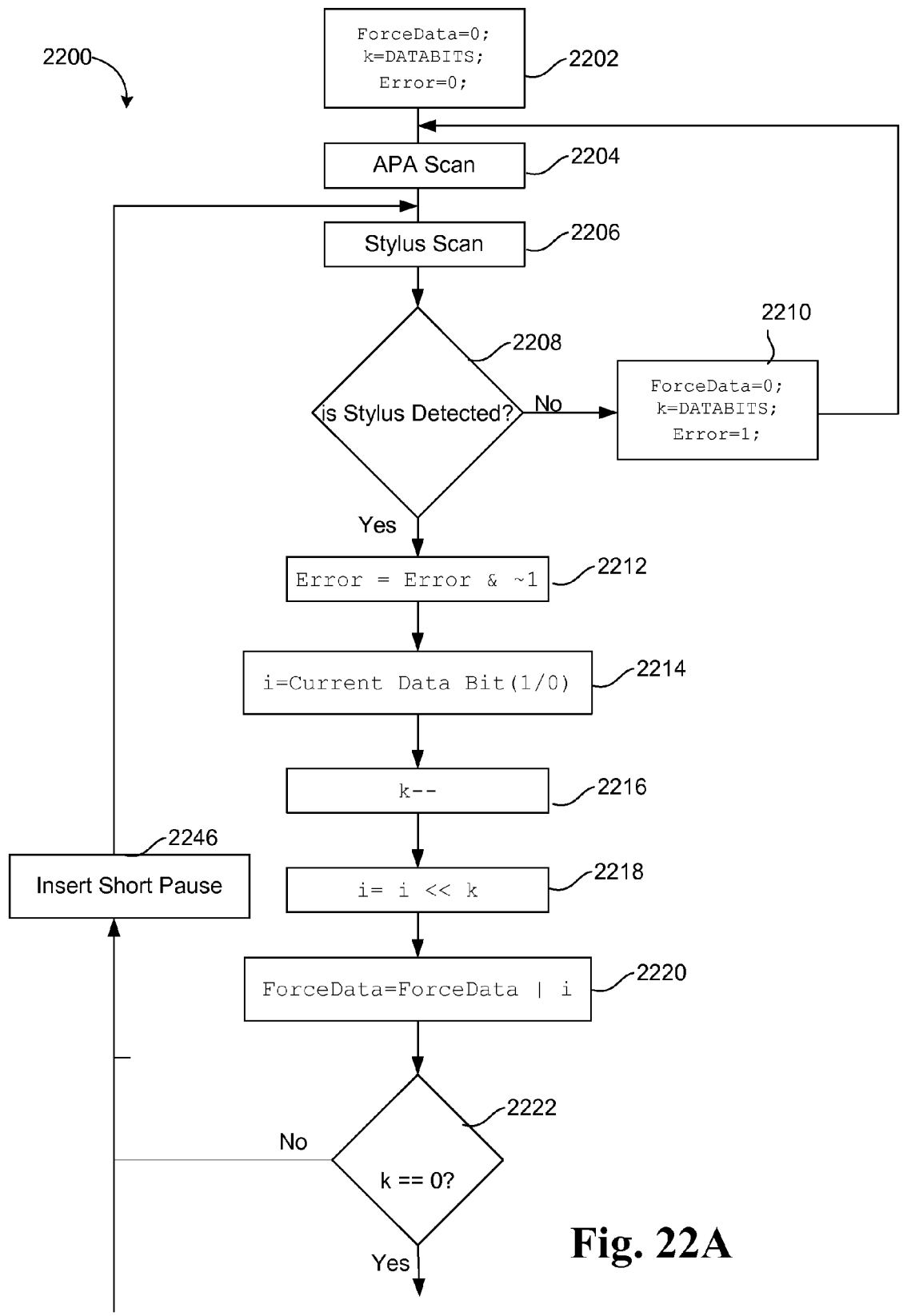
FIGS. 22A and 22B are flow charts illustrating one embodiment of a method of a host device operation.
Figure 22B:
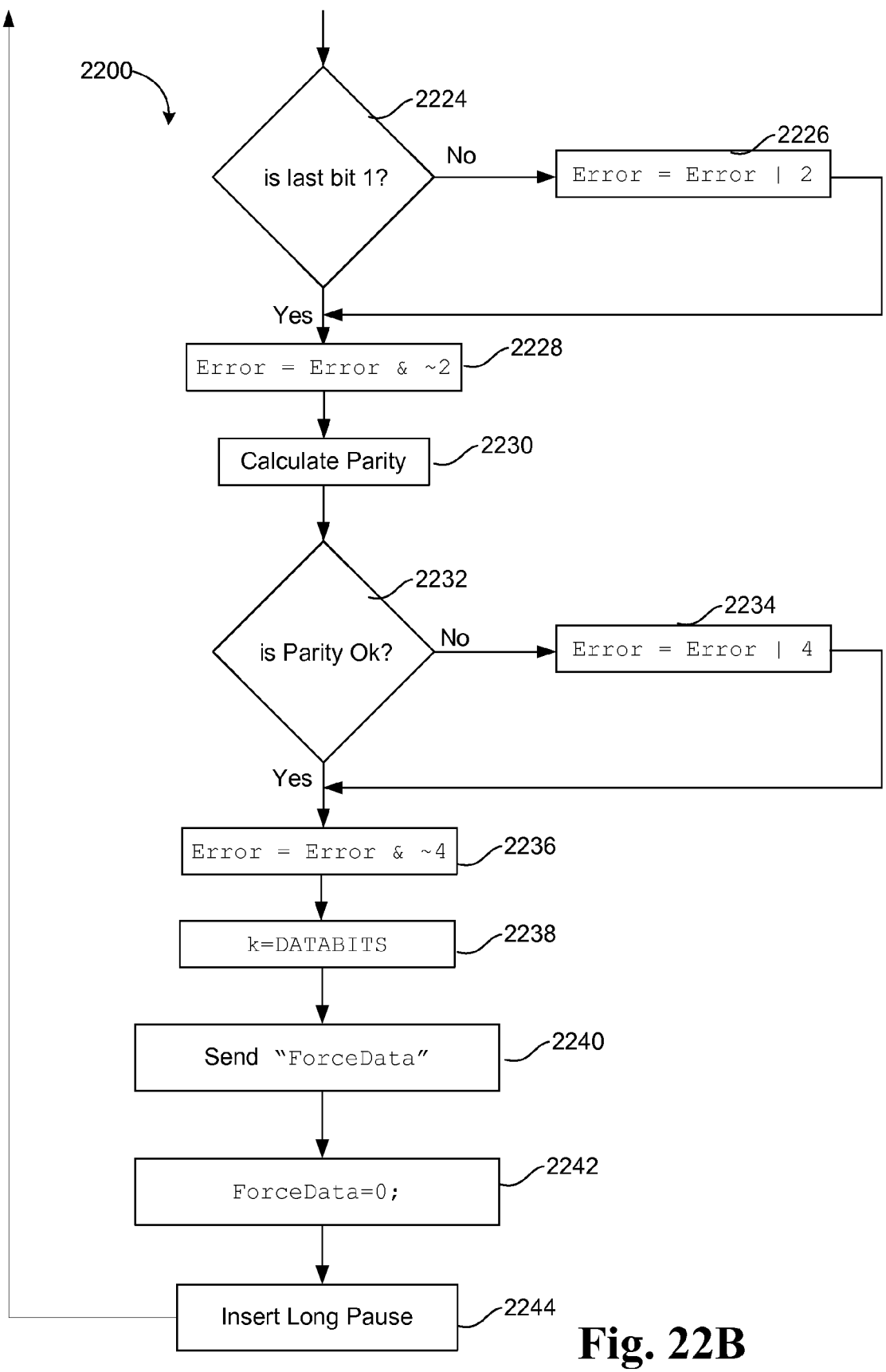

FIGS. 22A and 22B are flow charts illustrating one embodiment of a method 2200 of a host device operation. The method 2200 is performed by processing logic that may comprise hardware (circuitry, dedicated logic, etc.), software (such as is run on a general purpose computing system or a dedicated machine), firmware (embedded software), or any combination thereof. In one embodiment, the processing device 110 of FIG. 2 performs some of operations of method 2100. In another embodiment, the sensing device 530 of FIG. 5 performs the method 2100. In yet another embodiment, the capacitance sensor 101 of FIG. 1 performs the method 2100. Alternatively, other components of the electronic system 100 (FIG. 1) can perform some or all of the operations of method 2100.

Figure 23:
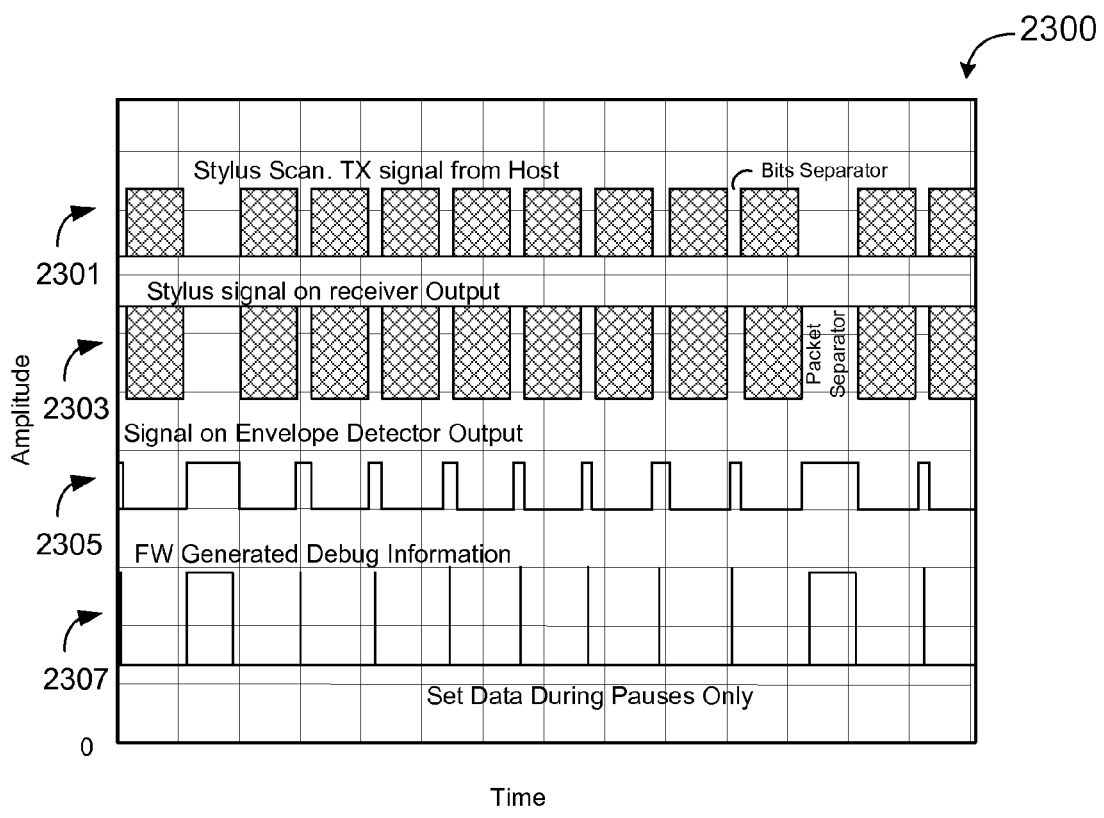
FIG. 23 is a waveform diagram illustrating a stylus scan according to one embodiment.
Figure 24:
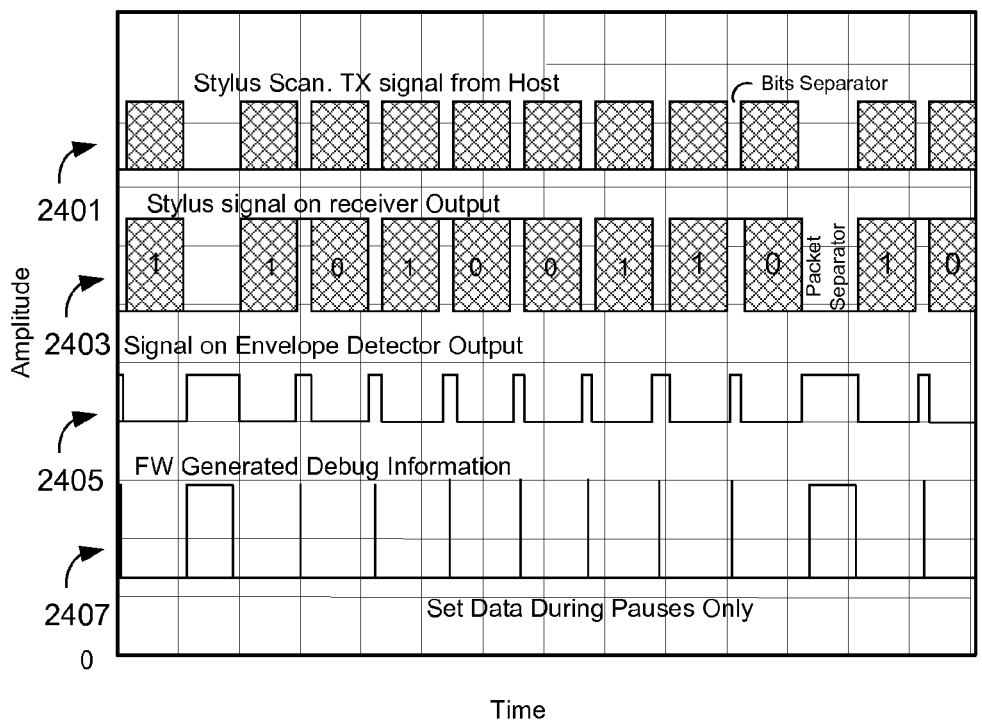
FIG. 24 is a waveform diagram illustrating the stylus scan and modulated data according to one embodiment.

Referring to FIGS. 22A and 22B, the processing logic begins with initializing variables (block 2202), performing an APA scan (block 2204), and performing a stylus scan (block 2206). The processing logic determines if the stylus is detected (block 2208). If the stylus is not detected, the processing logic returns an error code 1, and returns back to perform an APA scan at block 2204. In this embodiment, the long pause is formed during the APA scan at block 2204. This pause may be much longer than during the stylus only scans at block 2206. If the stylus is detected at block 2208, the processing logic clears error code (block 2212), and obtains a force bit (block 2214). It should be noted that the "k" variable shows the bit position in packet. This variable decreases (block 2216) each stylus scan performed at block 2206. The "i" on block 2214 is received data bit. The "i" is shifted to right bit position at block 2218. Then the "i" arithmetically OR-ed with previously received data. The processing logic determines if the variable "k" is zero (block 2222). If "k" is not zero at block 2222, the processing logic inserts a short pause for bit separation (block 2246), and goes to the next stylus position scan at block 2206. When "k" is zero at block 2222, then data packet is received. The processing logic determines if the last bit is logic high (1 bit) (block 2224). If not, the processing logic returns an error code 2. The processing logic clears the error code (block 2228) and calculates parity (CRC) (block 2230). The processing logic determines if the parity is valid (block 2232). If not, the processing logic returns an error code 4. The processing logic clears the error code (block 2236). The bits counter "k" initialized at block 2238. The processing logic sends received packet (block 2242) to a processing core (processing core of the processing device or a separate processing device such as a host device processor of a personal computer (PC)). The processing device clears the force data variable (block 2242) (reinitializes the variables), and inserts a long pause (block 2224), as well as a short pause (block 2226), returning to block 2206 for the next stylus scan to start receiving a next packet. One possible option is to send packet to PC only if error indicator is zero. If error indicator is not zero then the processing logic can send a previous packet. The long and short pauses at blocks 2244 and 2246 can be generated by the processing logic (e.g., firmware (FW), hardware (HW) software (SW), or any combination thereof) depending on free resources and project requirements of the design. The debug scope image when stylus is not detected by host device is shown in FIG. 20 described above. The debug scope image when stylus is detected by host device is shown in FIG. 23 and the modulated data is shown in FIG. 24. Comparing the two figures, one can see the difference between the bit separators and the packet separators. The new bits are assigned by the stylus during the pauses generated by the host device.

FIG. 23 is a waveform diagram 2300 illustrating a stylus scan according to one embodiment. Diagram 2300 shows the TX signal 2301 transmitted from the host device, a stylus signal 2303 on a stylus receiver output, a signal 2305 on an envelop detector output, and an operation 2307 performed by firmware in response to the signal, including setting the data bits, and measuring pause times. As described above, the "Signal Envelope" point in stylus schematic is equivalent to pause detector output. The debug information shows the data assigning points and packet synchronization. FIG. 23 shows the time when stylus assigns the data, when it is looks for a next bit scanning (short pause) and when it returns.

FIG. 24 is a waveform diagram illustrating the stylus scan and modulated data according to one embodiment. Diagram

2400 shows the TX signal 2401 transmitted from the host device, a stylus signal 2403 on a stylus receiver output, a signal 2405 on an envelop detector output, and an operation 2407 performed by firmware in response to the signal, including setting the data bits, and measuring pause times. As described above, the "Signal Envelope" point in stylus schematic is equivalent to pause detector output. The debug information shows the data assigning points and packet synchronization. FIG. 24 shows the time when stylus assigns the data, when it is looks for a next bit scanning (short pause) and when it returns. In this embodiment, the stylus tip voltage changes the phase related to host device signal. These changes indicate the transmitted data bits. These bits are shown in the signal 2403.

Described above are various embodiments of simultaneous data transmitting methods where one bit of stylus data is transmitted during one panel scan. The embodiments described below transmit two bits per one coordinate scan. For example, in one embodiment, an ITO panel is scanned in a mutual capacitance sensing mode in which the host device scans rows and subsequently scans columns, or vice versa. The stylus may touch the ITO panel and activates some rows and columns. The activated rows and columns include information about the stylus but are scanned in different time slots. In one embodiment, a first bit is transmitted during a row scan and a second bit is transmitted during a column scan. The bits may be separated by short pauses as described above.

Figure 25:
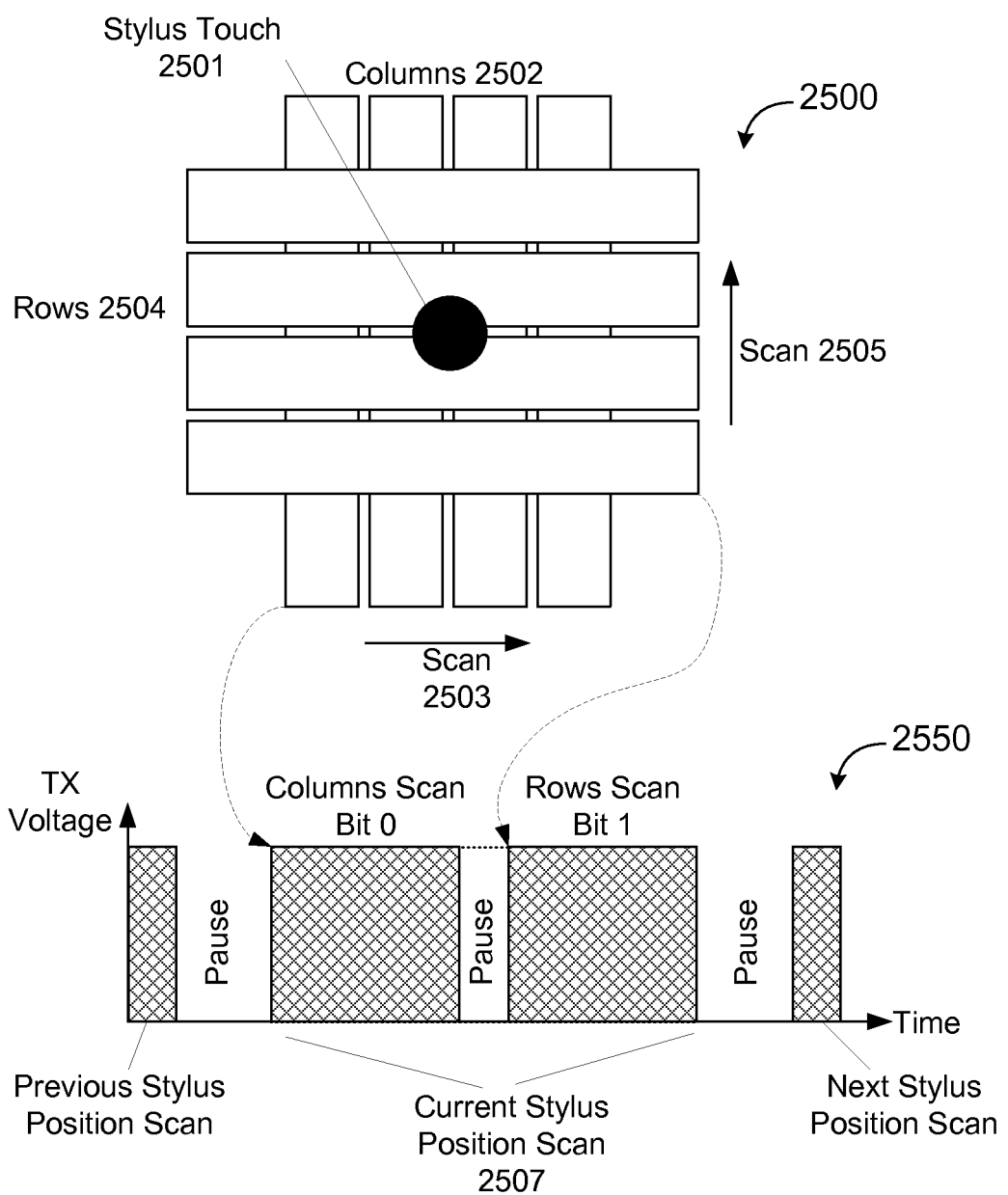
FIG. 25 illustrates a stylus touch on a set of electrodes and a waveform diagram illustrating transmission of at least two bits per one coordinate scan according to on embodiment.

FIG. 25 illustrates a stylus touch 2501 on a set of electrodes 2500 and a waveform diagram 2550 illustrating transmission of two bits per one coordinate scan according to on embodiment. In this embodiment, the host device scans columns 2502 first in a column scan 2503, and scans rows 2504 second in a row scan 2505. Of course, the order of the column scan 2503 and row scan 2505 can be reversed. In this embodiment, a first bit, "bit 0," is transmitted during the column scan 2503, and a second bit, bit 1, is transmitted during the row scan 2505. Also, multiple chancels can be assigned to one of the column scan 2503 and the row scan 2505. If more than one scanning channel is used, then the correct channel assignment should be taken into account. The scanning channels may be assigned to be close to each other in series. The columns 2502 and rows 2504 should not be scanned in the same time by different channels. As shown in the diagram 2550, the host device generates a TX signal (shown as crosshatched rectangles, and transmits the TX signal to the stylus. The host device measures the columns 2502 and rows 2504 for stylus position detection. The scans 2503 and 2505 collectively represent a current stylus position scan 2507. The stylus position scan 2507 is separated by a short pause, called a bit separator. The current stylus position scan 2507 is separated from a previous stylus position scan by a long pause and is separated from a next stylus position scan by another long pause. The long pauses are packet separators.

The two bits during a coordinate scan 2507 can be useful in real active stylus design. For example, the additional bit can be used for fast data transmitting, such as to transmit force sensor on/off states, button states, or a start of packet or an end of packet indictor.

Figure 26:
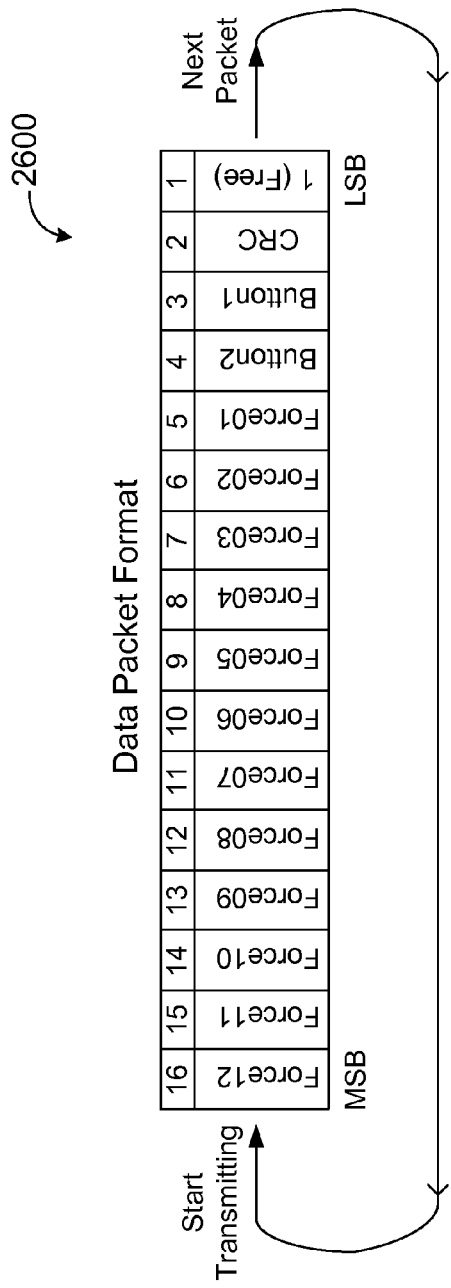
FIG. 26 illustrates one embodiment of a full packet format.

The stylus data can be transmitted in packets and the packets may have two different types of packet formats as described below with respect to FIGS. 26-31. These two packet formats include a full packet format and a relative packet format. The full packet format is used by the stylus to continuously send full force data values in each packet. The full packet format is simple to implement but may not be as effective from a data transmission perspective. The relative packet format is used by the stylus to send initially a full force data value and the subsequently send a difference in the full force data value and a next force data value. The force sensor values may change fast at an initial press and at a release of the stylus, and the force sensor values may change slower at other times. The relative packet format may be more complicated than the full packet format, but allows the stylus data to be transmitted faster since fewer bits are transmitted in the subsequent packets. The resulting force sensor data rate is faster for the relative packet format than the full packet format FIG. 26 illustrates one embodiment of a full packet 2600 using a full packet format. The full packet 2600 includes 16 bits and allows the transmission of all stylus data bits. In this embodiment, 12 bits are reserved for the force sensor data, two bits are reserved for the button data, and one bit is reserved for CRC. Also, in this embodiment, there is a space reserved for future modifications. For example, the reserved spaced may be a low battery indicator, an error indicator, or the like. In another embodiment, the full packet 2600 may include 10 bits, reserving 8 bits for the force sensor data, one bit for the button data, and one bit for CRC. In another embodiment, the full packet 2600 may include 4 bits, reserving 2 bits for the force sensor data, one bit for the button data, and one bit for CRC. Alternatively, the full packet 2600 may include more or less bits of data for force sensor data, button data, and CRC as would be appreciated by one of ordinary skill in the art having the benefit of this disclosure. It should also be noted that the packet length can be adjusted during operation, for example, from 16 bits to 10 bits. For example, the 10 bits packet length may be enough. Also, the packets can be split up into coarse and fine packets as illustrated in an example in FIG. 27.

Figure 27:
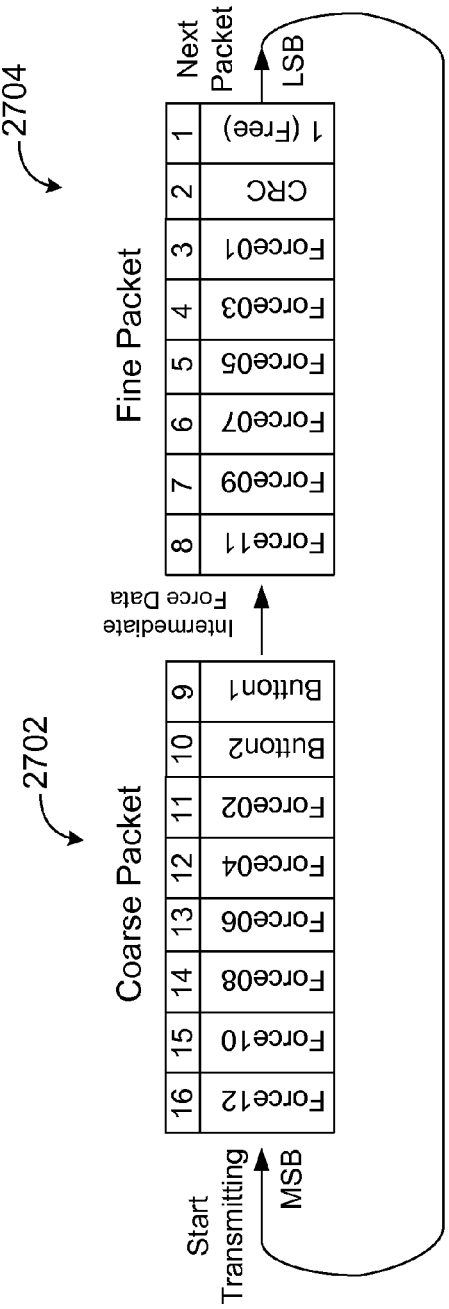
FIG. 27 illustrates one embodiment of a coarse packet and a fine packet for transmitting stylus data.

FIG. 27 illustrates one embodiment of a coarse packet 2702 and a fine packet 2704 for transmitting stylus data. The coarse packet 2702 may include the even bits of the force sensor data and the bits for the button data, and the fine packet 2704 may include the odd bits of the force sensor data and the bits for the CRC and the reserved space. Of course, other combinations of bits can be sent in the coarse packet 2702 and the fine packet 2704. In this embodiment, the force sensor data in the two packets can be transmitted in the same time it takes to transmit the full data packet 2600. The technique of transmitting the coarse packet 2702 and fine packet 2704 may allow for tracking fast force changes dynamically. The coarse packet 2702 can be transmitted initially and periodically, and the fine packet 2704 can be subsequently transmitted to track small changes in the force sense data. This may increase the data reporting rate.

The relative packet format may be used transmit the difference between a current data value and a previous data value. The force sensor data may change by only a few bits between the current data value and the previous data value. The two bits per coordinate scan can be implemented with sending relative packets. For example, the second bit can be used as an on/off indicator and an end of packet indicator. This information can be used by an operating system of the host device for tap or double tap gesture recognitions, for example. Of course, the information can be used for other purposes. As described below, the relative data packets can be one of four different relative packets, including 1) "1" The force sensor is not pressed; 2) "2" The force sensor is just pressed; 3) "3" The continuous force sensor press; and 4) "4" The force sensor is released.

Figure 28:
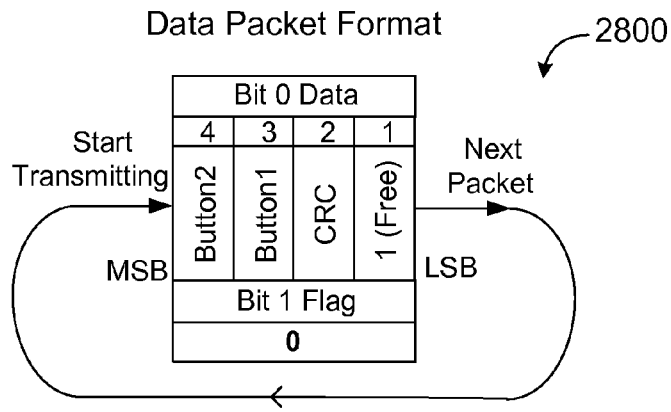
FIG. 28 illustrates one embodiment of a relative data packet when the force sensor is not pressed.
Figure 29:
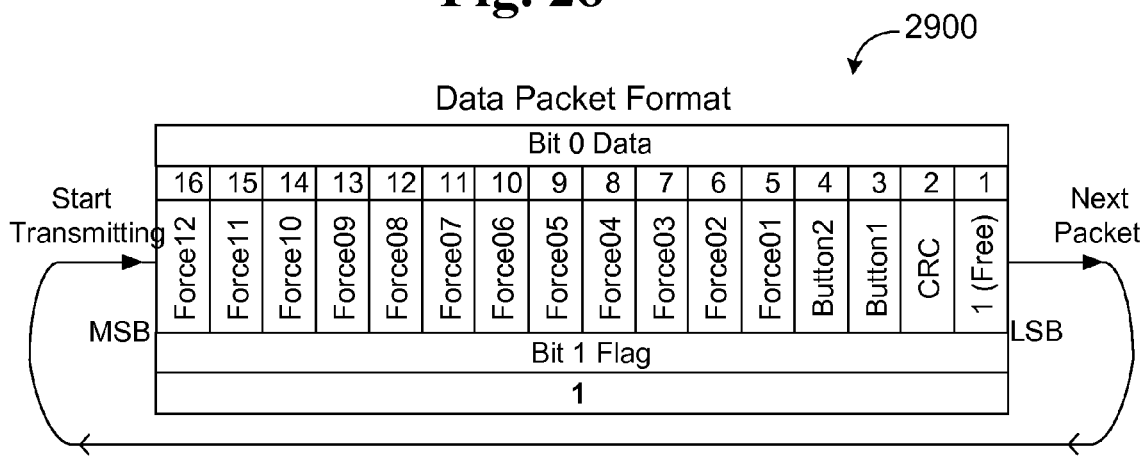
FIG. 29 illustrates one embodiment of a relative data packet when the force sensor is just pressed.
Figure 30:
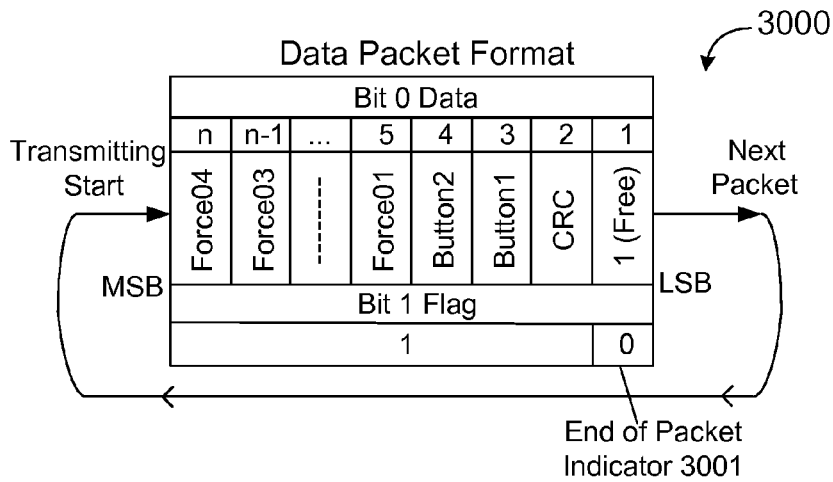
FIG. 30 illustrates one embodiment of a relative data packet with continuous force data when the force sensor is still pressed.
Figure 31:
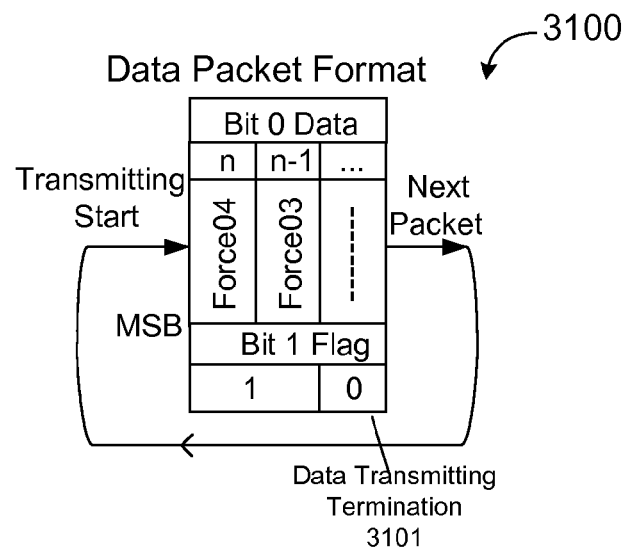
FIG. 31 illustrates one embodiment of a relative data packet when the force sensor is released from being pressed.
Figure 32:
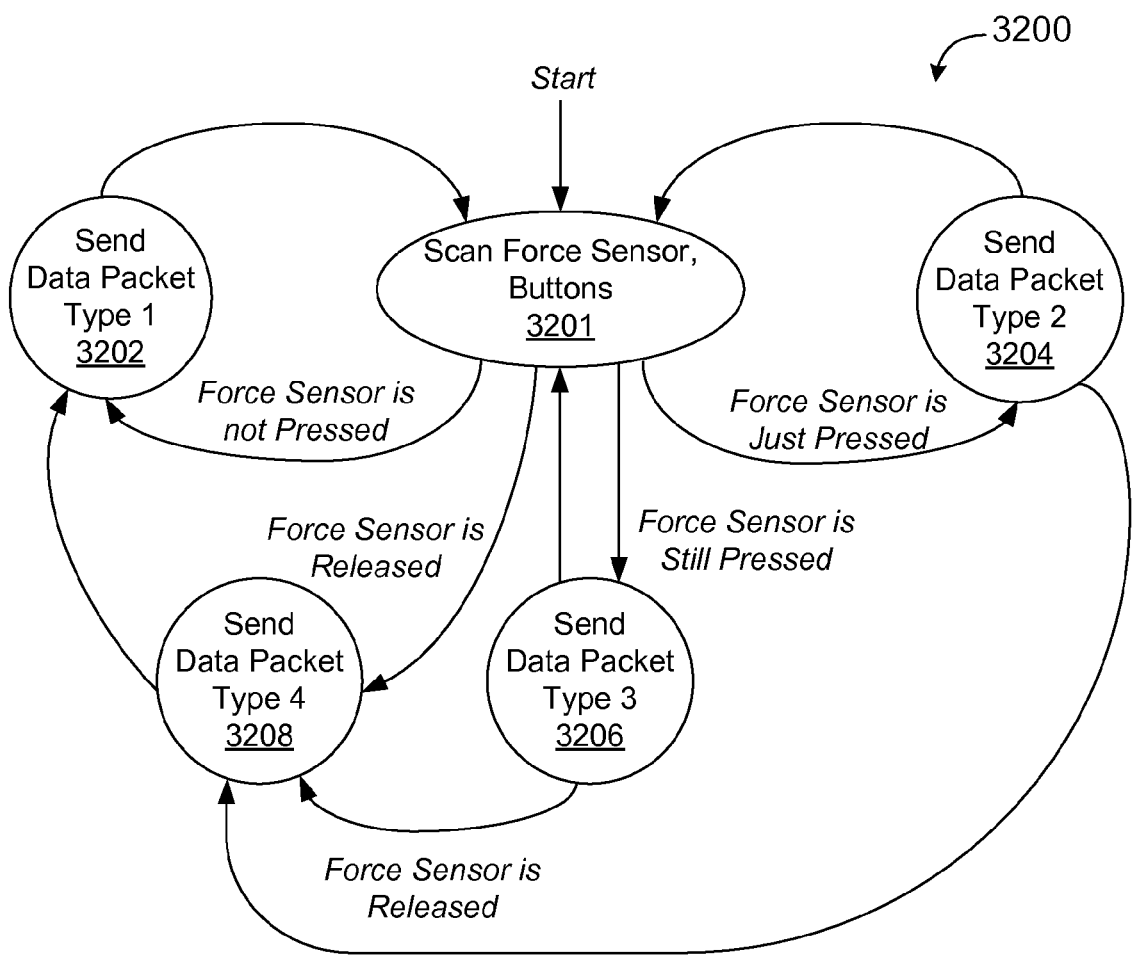
FIG. 32 is a state diagram of a stylus data state machine according to one embodiment.

FIG. 28 illustrates one embodiment of a relative data packet 2800 when the force sensor is not pressed. FIG. 29 illustrates one embodiment of a relative data packet 2900 when the force sensor is just pressed. FIG. 30 illustrates one embodiment of a relative data packet 3000 with continuous force data when the force sensor is still pressed. FIG. 31 illustrates one embodiment of a relative data packet 3100 when the force sensor is released from being pressed. FIG. 32 is a state diagram of a stylus data state machine 3200 for relative data transmitting according to one embodiment. The following describes the contents of the relative data packets that are sent in the different states of the stylus data state machine 3200 for relative data transmitting. The stylus data state machine 3200 for relative data transmitting starts in a first state 3201 in which the force sensor values and the button states are obtained by scanning the force sensor and the buttons. The stylus data state machine 3200 transitions from the first state 3201 to one of the other four states 3202-3208 as described below. In most cases, the stylus data state machine 3200 returns back to the first state after transmitting the corresponding packet. However, in one case, the stylus data state machine 3200 transitions from the state 3206 to the state 3208 when the force sensor is released. The stylus data state machine 3200 can also transition between the state 3208 and 3202, as well as between 3206 and 3204 to state 3208.

When the force sensor is not pressed (state 3202), then the force data to transmit is zero and buttons states only need to be transmitted, as illustrated in the relative packet 2800 FIG. 28. In this state 3202, the two bits for the button data, a CRC bit, and one option bit are transmitted. In one embodiment, the first bit, "Bit 0," is used for data transmitting and the second bit, "Bit 1," indicates the force on/off state.

When the force sensor is just pressed (state 3204), then the full stylus data packet 2900 needs to be transmitted, as illustrated in FIG. 29. In this state 3204, the 16 bits of the full packet 2900 are transmitted as done in the full packet mode. The first bit, "Bit 1," is set to 1 to indicate that the force sensor touches the panel. This information can be used by the operating system for tap and double tap gesture recognition, for example.

When the force sensor is still pressed (state 3206), then the continuous force sensor data is transmitted in the relative packet 3000, as illustrated in FIG. 30. In this state 3206, the number of force bits that needs to be transmitted may not be constant and depends on the difference between previous and current force sensor values. For example, the relative packet 3000 can vary from zero to 12 bits, and can average 3-5 bits per packet. In this embodiment, the first bit, "Bit 1," may be high (logical 1), except for the last bit to operate as an end of packet indicator 3001. For example, the falling edge may indicate end of packet but does not indicate force sensor releasing. When the first bit, "Bit 1," is low (logical 0) twice in series, this may indicate a force sensor release indication. As the result, the force sensor touch can be transmitted during a coordinate scan, and the force sensor release can be transmitted during a second coordinate scan.

When the force sensor is released (state 3208), then the relative packet 3100 is transmitted, as illustrated in FIG. 31. In this state 3208, if force sensor is released then the first bit, "Bit 1," is set to 0 immediately and the packet 3100 is rejected because the CRC is wrong and the next packet includes a 0 for the first bit, "Bit 1." The two "Bit 1" zeros in series means that force sensor is released. The "Bit 1" 0 to 1 transition inside the packet indicates that sensor is pressed but controller should finish the current packet transmitting and then start transmitting a next packet. The data transmitting termination is illustrated as 3101.

In short, the stylus data state machine 3200 begins with the controller scanning the force sensor value. If the force sensor is not pressed, then the controller sends the data packet type 1 at state 3202. If a user touches the force sensor to the ITO panel, then controller waits for an end of packet type 1 and then sends the packet type 2 at state 3204. If force sensor is still pressed, then controller measures force sensor value and sends difference using type 3 packets at state 3206. If force sensor is released, then controller sends packet type 4 at state 3208, and then sends packet type 1 at state 3202. If force sensor is released during packet type 2 at state 3204 or packet type 3 3206, the controller goes to transmitting the packet type 4 immediately at state 3208.

In one embodiment, the stylus data state machine 3200 can operate in the separated data transfer methods described above. In another embodiment, the stylus data state machine can operate in the simultaneous data transfer methods described above. For example, the simultaneous data transfer method may be used for slow data transmitting, like for stylus data such as battery voltage or force sensor update. The separated method can be used for fast data like a force on/off state, buttons, and initial force value transmitting. The few bits may not increase the total position report rate too much. The benefits are in data transfer speed and individual events like a buttons on/off report speed.

Figure 33:
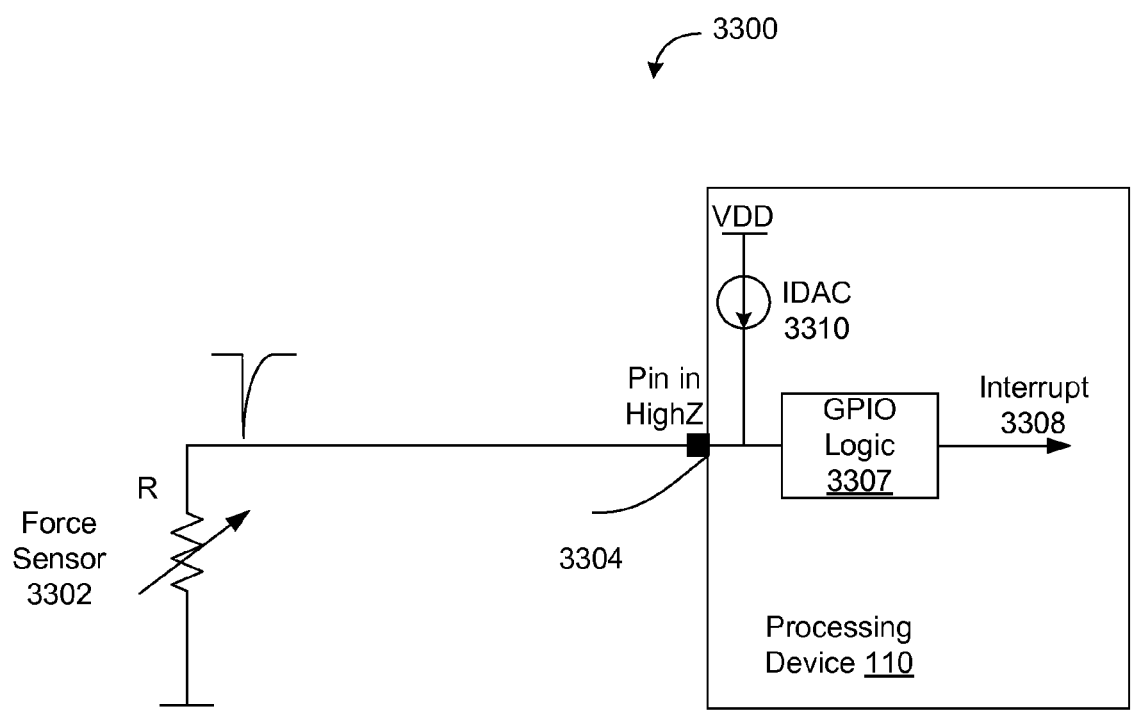
FIG. 33 is a block diagram of a resistive force sensor to an input/output connection according to on embodiment.

In one embodiment, the force sensor releasing can be detected by using interrupts, such as GPIO interrupts, such as illustrated in FIG. 33. The interrupts allow the controller to break data transmitting in any time and doesn't wait for full force sensor scan.

FIG. 33 is a block diagram of a resistive force sensor 3302 to an input/output connection 3304 according to on embodiment. The force sensor 3302 is connected to I/O connection 3304. The I/O connection 3304 may be a pin that is configured as an interrupt input of the processing device 110. A tip release may change a voltage on the pin, which is processed by GPIO logic 3307 to generate an interrupt 3308, such as a wake-up interrupt. The force sensor 3302 may be a resistive force sensor. The typical resistive force sensor value in a released state may be 1 Mohm to 10 Mohm, and the resistive force sensor value in a pressed state may be in the kohm range. The change in resistance can be detected by the GPIO logic 3307 to generate the interrupt 3308. In the depicted embodiment, a programmable current source 3310 (IDAC) supplies the current for the force sensor. This current value is high enough to put the I/O connection 3304 in a logic high state. In one embodiment, the current value is 1 uA or less in the logic high state. This is acceptable value for battery-powered devices. Alternatively, other current values may be achieved as would be appreciated by one of ordinary skill in the art having the benefit of this disclosure. Also, in other embodiments, external pull-up resistors can be used instead of the programmable current source 3310 as would also be appreciated by one of ordinary skill in the art having the benefit of this disclosure.

The embodiments described herein describe various aspects of active stylus to host device data transmitting methods. For example, transmission of the stylus data between the stylus and the host device using the ITO panel without usage of additional antennas may be achieved. Also, the method of transmitting data between a stylus and a host device in parallel with the stylus position scanning can be achieved. Various embodiments described above also allow two bits to be transmitted during one coordinate scan, such as transmitting a first bit during a row scan and transmitting a second bit during a column scan. As described herein, pauses can be used between scans for synchronization and bits separation. Also, the embodiments described herein can use full or relative packet formats for transmitting stylus data to the host device from the stylus. Similarly, described above are embodiments of transmitting fine and coarse packets.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   at a stylus configured to capacitively couple to a capacitive sense array associated with a host device, wherein the capacitive sense array includes a plurality of electrodes:

receiving an indication that the host device is performing a set of coordinate measurement operations to determine a coordinate of the stylus proximate to the capacitive sense array, wherein the set of coordinate measurement operations comprises a first measurement operation of a first set of electrodes of the capacitive sense array and a second measurement operation of a second set of electrodes of the capacitive sense array; and in response to receiving the indication, transmitting a data packet of stylus data from the stylus to the capacitive sense array associated with the host device while the host device is performing the set of coordinate measurement operations on the plurality of electrodes of the capacitive sense array, including:
   transmitting a first bit of the data packet during the first measurement operation; and
   transmitting a second bit of the data packet during the second measurement operation.

2. The method of claim 1, further comprising:
   receiving, at the stylus, a second indication that the host device is performing a second set of coordinate measurement operations to determine a second coordinate of the stylus proximate to the capacitive sense array; and
   transmitting an additional bit of the data packet to the host device while the host device is performing the second set of coordinate measurement operations.

3. The method of claim 1, further comprising:
   receiving, at the stylus, a second indication that the host device is performing a second set of coordinate measurement operations to determine a second coordinate of the stylus proximate to the capacitive sense array, wherein the second set of coordinate measurement operations comprises a third measurement operation of the first set of electrodes and a fourth measurement operation of the second set of electrodes;
   transmitting a third bit of the data packet during the third measurement operation; and
   transmitting a fourth bit of the data packet during the fourth measurement operation.

4. The method of claim 1, further comprising:
   obtaining the stylus data; and
   creating the data packet with the stylus data.

5. The method of claim 4, wherein obtaining the stylus data comprises:
   measuring a force sensor value;
   obtaining a button status; and
   calculating a checksum of the force sensor value and the button status, wherein the data packet comprises the checksum.

6. The method of claim 1, wherein transmitting the first bit comprises transmitting the first bit after a first pause to indicate a start of the data packet, wherein transmitting the second bit comprises transmitting the second bit after a second pause, the second pause being shorter than the first pause to indicate a bit separation between bits of the data packet.

7. The method of claim 1, wherein the first set of electrodes includes either row electrodes or column electrodes, wherein the second set of electrodes includes the other one of the row electrodes or column electrodes.

8. The method of claim 1, wherein the set of coordinate measurement operations comprises a row measurement operation as the first measurement operation and a column measurement operation as the second measurement operation, wherein the transmitting the data packet comprises:

transmitting the first bit of the data packet during the row measurement operation; and
transmitting the second bit of the data packet during the column measurement operation.

9. The method of claim 1, wherein the data packet is at least one of a full packet format or a relative packet format.

10. The method of claim 1, wherein the transmitting the data packet comprises transmitting a first full packet format comprising a value of the stylus data, and wherein the method further comprises transmitting a subsequent relative packet format comprising a difference between the value of the stylus data and a second value of subsequent stylus data.

11. The method of claim 1, wherein the data packet comprises at least four bits, and wherein the at least four bits comprises:
   at least two bits of force sensor data;
   at least one bit for button data; and
   at least one bit for error check information.

12. A system comprising:
   a host device; and
   a stylus configured to capacitively couple to a capacitive sense array associated with the host device, wherein the capacitive sense array includes a plurality of electrodes, comprising:
      a tip driver;
      a receiver configured to receive an indication of a set of coordinate measurement operations performed by the host device to determine coordinates of the stylus proximate to a capacitive sense array of the host device, wherein the set of coordinate measurement operations comprises a first measurement operation of a first set of electrodes of the capacitive sense array and a second measurement operation of a second set of electrodes of the capacitive sense array; and
      a processing device coupled to the receiver and the tip driver, wherein the processing device is configured to in response to receiving the indication, transmit a data packet of stylus data to the capacitive sense array associated with the host device while the host device is performing the set of coordinate measurement operations on the plurality of electrodes of the capacitive sense array, wherein transmitting the data packet of stylus data further includes:
         transmitting a first bit of the data packet of stylus data during the first measurement operation of the first set of electrodes; and
         transmitting a second bit of the data packet of stylus data during the second measurement operation of the second set of electrodes.

13. The system of claim 12, further comprising the host device comprising:
   a transmitter;
   the capacitive sense array; and
   a second processing device coupled to the transmitter and the capacitive sense array, wherein the second processing device is configured to perform the sets of coordinate measurement operations to determine the coordinates of the stylus proximate to the capacitive sense array of the host device, and wherein the host device is configured to transmit the indications to the receiver of the stylus via the transmitter.

14. The system of claim 12, wherein the stylus data comprises at least one of a force, sensor state, a button state, a start packet indicator, or an end packet indicator.

15. The system of claim 12, further comprising:
   a force sensor coupled to the processing device; and
   a button coupled to the processing device, wherein the processing device is configured to obtain force sensor values from the force sensor, to obtain button statuses from the button, to calculate checksums of a respective one of the force sensor values and a respective one of the button statuses, and to create the data packet with the respective one of the force sensor values, the respective one of the button statuses, and a respective one of the checksums.

16. The system of claim 15, wherein the stylus data packets comprise a full packet format, and wherein the processing device is configured to transmit full force data values in the stylus data packets.

17. The system of claim 15, wherein a first one of the stylus data packets comprises a full packet format with a full force data value, and wherein subsequent ones of the stylus data packets comprise a relative packet format with a difference between a previous force data value and a subsequent data value.

18. The system of claim 12, wherein the first set of electrodes includes row electrodes or column electrodes and the second set of electrodes include the other one of the row electrodes or column electrodes, and wherein the processing device is configured to transmit the first bit of the data packet during the first measurement operation of the first set of row electrodes or column electrodes and to transmit the second bit of the data packet during the second measurement operation of the second set of the other one of the row electrodes or column electrodes.

19. A stylus configured to capacitively couple to a capacitive sense array associated with the host device, wherein the capacitive sense array includes a plurality of electrodes, comprising:
   a force sensor;
   a processing device coupled to the force sensor, wherein the processing device is configured to implement a stylus data state machine, and wherein the stylus data state machine comprises a first state in which the force sensor is not pressed, a second state in which the force sensor is pressed, a third state in which the force sensor is still pressed, and a fourth state in which the force sensor is released;
   a receiver coupled to the processing device; and
   a tip driver coupled to the processing device, wherein the processing device is configured to:
      receive an indication via the receiver from the host device that the host device is performing a set of coordinate measurement operations to determine a coordinate of the stylus, the set of coordinate measurement operations comprising a first measurement operation of a first set of electrodes and a second measurement operation of a second set of electrodes; and
      in response to receiving the indication, transmit a data packet of stylus data to the capacitive sense array associated with the host device via the tip driver in the respective one of the first state, second state, third state, and fourth state while the host device is performing the set of coordinate measurement operations on the plurality of electrodes of the capacitive sense array, wherein the processing device is configured to transmit the data packet by transmitting a first bit of the data packet during the first measurement operation and transmitting a second bit of the data packet during the second measurement operation.

20. The stylus of claim 19, further comprising:
receiving, at the stylus, a second indication that the host device is performing a second set of coordinate measurement operations to determine a second coordinate of the stylus; and
transmitting an additional bit of the data packet to the host device while the host device is performing the second set of coordinate measurement operations.

* * * * *